United States Patent
Medrano Catalan et al.

(10) Patent No.: US 12,503,370 B2
(45) Date of Patent: Dec. 23, 2025

(54) PROCESS FOR THE PREPARATION OF SILICON-CONTAINING COMPOSITE PARTICLES

(71) Applicant: NEXEON LIMITED, Abingdon (GB)

(72) Inventors: Jose Medrano Catalan, Oxford (GB); Markus Andersson, Oxford (GB)

(73) Assignee: NEXEON LIMITED, Abingdon (GB)

( * ) Notice: Subject to any disclaimer, the term of this patent is extended or adjusted under 35 U.S.C. 154(b) by 0 days.

(21) Appl. No.: 18/855,083

(22) PCT Filed: Apr. 21, 2023

(86) PCT No.: PCT/GB2023/051063
§ 371 (c)(1),
(2) Date: Oct. 8, 2024

(87) PCT Pub. No.: WO2023/203352
PCT Pub. Date: Oct. 26, 2023

(65) Prior Publication Data
US 2025/0109027 A1     Apr. 3, 2025

(30) Foreign Application Priority Data

Apr. 22, 2022 (GB) .................................. 2205891
Dec. 14, 2022 (GB) .................................. 2218883

(51) Int. Cl.
*C01B 33/029* (2006.01)
*C23C 16/24* (2006.01)
*C23C 16/44* (2006.01)
*C23C 16/52* (2006.01)
*H01M 4/38* (2006.01)

(52) U.S. Cl.
CPC ............ *C01B 33/029* (2013.01); *C23C 16/24* (2013.01); *C23C 16/4417* (2013.01); *C23C 16/52* (2013.01); *C01P 2004/61* (2013.01); *C01P 2004/62* (2013.01); *C01P 2006/14* (2013.01); *C01P 2006/16* (2013.01); *C01P 2006/40* (2013.01); *H01M 4/386* (2013.01)

(58) Field of Classification Search
None
See application file for complete search history.

(56) References Cited

U.S. PATENT DOCUMENTS

2022/0059820 A1* 2/2022 Costantino ............ H01M 4/364
2024/0376594 A1* 11/2024 Dräger ................ C23C 16/4417

FOREIGN PATENT DOCUMENTS

| CA | 3191017 A1 | 2/2022 | |
|---|---|---|---|
| GB | 2618996 B | 6/2024 | |
| WO | WO-2020095067 A1 | 5/2020 | |
| WO | WO-2020128495 A1 | 6/2020 | |
| WO | WO-2020128523 A1 * | 6/2020 | ........... C04B 41/009 |
| WO | WO-2021048557 A1 | 3/2021 | |
| WO | 2022035879 | 2/2022 | |
| WO | WO-2022029422 A1 | 2/2022 | |
| WO | WO-2022029423 A1 * | 2/2022 | .......... H01M 4/0404 |
| WO | WO-2022035879 A1 * | 2/2022 | ............. C01B 32/00 |

OTHER PUBLICATIONS

"Korean Application No. 10-2024-7014815, Office Action dated Sep. 24, 2024", w Concise Statement of Relevance, (Sep. 24, 2024), 7 pgs.
"British Application No. 2205891.1, Decision to Grant dated Mar. 21, 2024", (Mar. 21, 2024), 2 pgs.
"British Application No. 2205891.1, Notification of Grant dated May 7, 2024", (May 7, 2024), 2 pgs.
"British Application No. 2205891.1, Search and Examination Report dated Oct. 17, 2022", Oct. 17, 2022), 6 pgs.
"International Application No. PCT/GB2023/051063, International Search Report dated 07- 14-2023", (Jul. 14, 2023), 5 pgs.
"International Application No. PCT/GB2023/051063, Written Opinion dated Jul. 14, 2023", (Jul. 14, 2023), 6 pgs.
Choy, K. L., "Chemical vapour deposition of coatings", Progress in materials science 48.2, (Jul. 14, 2023), 57-170.
Winter, Martin, et al., "Insertion electrode materials for rechargeable lithium batteries", Advanced materials 10.10, (1998), 725-763.

\* cited by examiner

*Primary Examiner* — Jose I Hernandez-Kenney
(74) *Attorney, Agent, or Firm* — Schwegman Lundberg & Woessner, P.A.

(57) ABSTRACT

The invention relates to a process for preparing composite particles, the process comprising the steps of: (a) providing a plurality of porous particles in a pressure reactor; (b) contacting the plurality of porous particles with a silicon precursor gas at conditions effective to cause deposition of silicon in the pores of the porous particles to provide composite particles comprising a porous particle framework and elemental silicon within the pores of the porous particle framework; and (c) during step (b), withdrawing an effluent gas from the pressure reactor, wherein the silicon precursor gas is introduced into the pressure reactor continuously.

28 Claims, 5 Drawing Sheets

PROCESS FOR THE PREPARATION OF SILICON-CONTAINING COMPOSITE PARTICLES

PRIORITY APPLICATIONS

This application is a U.S. National Stage Filing under 35 U.S.C. § 371 from International Application No. PCT/GB2023/051063, filed on Apr. 21, 2023, and published as WO2023/203352 on Oct. 26, 2023, which claims the benefit of priority to British Application No. 2218883.3, filed on Dec. 14, 2022 to British Application No. 2205891.1, filed on Apr. 22, 2022; the benefit of priority of each of which is hereby claimed herein, and which applications and publication are hereby incorporated herein by reference in their entireties.

This invention relates to processes for the production of silicon-containing composite particles that are suitable for use as anode active materials in rechargeable lithium-ion batteries.

A typical lithium-ion battery (LIB) comprises an anode, a cathode and a lithium-containing electrolyte. The anode generally comprises a metal current collector provided with a layer of an electroactive material, defined herein as a material which is capable of inserting and releasing lithium ions during the charging and discharging of a battery. The terms "cathode" and "anode" are used herein in the sense that the battery is placed across a load, such that the anode is the negative electrode. When a LIB is charged, lithium ions are transported from the cathode via the electrolyte to the anode and are inserted into the electroactive material of the anode as intercalated lithium atoms. The term "battery" is used herein to refer both to devices containing a single lithium-ion cell and to devices containing multiple connected lithium-ion cells.

LIBs were developed in the 1980s and 1990s and have since found wide application in portable electronic devices. The development of electric or hybrid vehicles in recent has created a significant new market for LIBs and renewable energy sources have created further demand for on-grid energy storage which can be met at least in part by LIB farms. Overall, global production of LIBs is projected to grow from around 290 GWh in 2018 to over 2,000 GWh in 2028.

Alongside the growth in total storage capacity, there is significant interest in improving the gravimetric and/or volumetric capacities of rechargeable metal-ion batteries such that the same energy storage is achieved with less battery mass and/or less battery volume. Conventional LIBs use graphite as the anode electroactive material. Graphite anodes can accommodate a maximum of one lithium atom for every six carbon atoms resulting in a maximum theoretical specific capacity of 372 mAh/g in a lithium-ion battery, with a practical capacity that is somewhat lower (ca. 340 to 360 mAh/g).

Silicon is a promising alternative to graphite because of its very high capacity for lithium (see, for example, Insertion Electrode Materials for Rechargeable Lithium Batteries, Winter, M. et al. in Adv. Mater. 1998, 10, No. 10). Silicon has a theoretical maximum specific capacity of about 3,600 mAh/g in a lithium-ion battery (based on $Li_{15}Si_4$). However, the intercalation of lithium into bulk silicon results in expansion of the silicon material by up to 400% of its original volume which can lead to failure of the battery. Repeated charge-discharge cycles cause significant mechanical stress, resulting in fracturing and delamination of the silicon. The formation of a solid electrolyte interphase (SEI) layer on the silicon surface consumes the electrolyte and newly exposed silicon surfaces on fracture surfaces results in further electrolyte decomposition and increased thickness of the SEI layer and irreversible consumption of lithium. These failure mechanisms collectively result in an unacceptable loss of electrochemical capacity over successive charging and discharging cycles.

The applicant has previously reported the development of a class of electroactive materials having a composite structure in which electroactive materials, such as silicon, are deposited into the pore network of a highly porous conductive particulate material, e.g. a porous carbon material (see WO 2020/095067 and WO 2020/128495). The silicon in these materials is finely divided with individual silicon structures having dimensions of the order of a few nanometres or less which therefore undergo minimal stress and strain during charging and discharging. As the silicon is confined to the pore volume of a porous material, exposure of the silicon surfaces to electrolyte is minimised, effectively limiting the extent of SEI formation. As a result, these materials exhibit good reversible capacity retention over multiple charge-discharge cycles.

The materials described in WO 2020/095067 and WO 2020/128495 have been synthesized by chemical vapour infiltration (CVI) in different reactor systems (static, rotary and FBR). The porous conductive particles are contacted with a silicon precursor, typically silane gas, at atmospheric pressure and at temperatures between 400 to 700° C. Reaction rates at these temperatures are fast, however, the silicon precursor molecules need to go through a tortuous path to access pore spaces of only a few nanometres in diameter. This means, that to obtain a homogeneous infiltration in such reactor systems, the reaction temperature needs to be relatively high to avoid mass transfer becoming a rate limiting step. Furthermore, the silicon precursor generally needs to be used at high dilution in an inert gas. Too high a concentration of the silicon precursor can result in rapid and uncontrolled deposition of silicon deposition in the outermost pores which then blocks access to much of the available pore volume. As a result, the deposited silicon does not have the fine structure associated with deposition in narrow pores, but is coarse and exposed and therefore demonstrates poor cycling behaviour. However, the use of low concentrations of the silicon precursor means that the reaction time to achieve the necessary silicon loading in the composite particles is relatively long, reducing throughput.

Systems that are operated by batch dosing of silicon precursor have further disadvantages. In order to obtain composite particles with the required content of silicon, several cycles of CVI deposition are necessary. At the beginning of each cycle, a charge of silicon precursor is introduced into the reactor. The reactor temperature generally decreases as silicon precursor is added, necessitating heating of the reactor to return the feedstock to reaction temperature. Removal of by-product gases after each cycle is also required. Consequently, the overall manufacturing time of the composite particles is long and the throughput of such systems is poor.

These systems are therefore ill-suited to scale-up and producing large quantities of material is difficult.

There is therefore a need in the art for improved processes for preparing silicon-containing composite particles that are suitable for use as electroactive materials in LIBs. In particular, there is a need for processes for preparing such composite particles on a large-scale, with high throughput, while maintaining product quality.

In a first aspect, the invention provides a process for preparing composite particles, the process comprising the steps of:
(a) providing a plurality of porous particles in a pressure reactor;
(b) contacting the plurality of porous particles with a silicon precursor gas at conditions effective to cause deposition of silicon in the pores of the porous particles to provide composite particles comprising a porous particle framework and elemental silicon within the pores of the porous particle framework; and
(c) during said contacting, withdrawing an effluent gas from the pressure reactor,
wherein the silicon precursor gas is introduced into the pressure reactor continuously.

The invention therefore relates in general terms to a process for preparing a composite particulate material in which nanoscale silicon domains are deposited into the pore network of porous particles by a process of chemical vapour infiltration, i.e. by the thermal decomposition of a silicon-containing precursor compound. The composite particles therefore comprise a first component in the form of porous particle framework that is derived from the porous particles, and a second component in the form of a plurality of nanoscale silicon domains that are disposed within the pore structure of the porous particle framework. As used herein, the term "nanoscale silicon domain" refers to a nanoscale body of elemental silicon having maximum dimensions that are determined by the location of the silicon within the micropores and/or mesopores of the porous particles.

Operating the pressure reactor under these conditions means that the CVI deposition proceeds under conditions where fresh silicon precursor is added before byproducts are removed fully from the system. Thus, as the silicon precursor gas is continuously added to the reactor it mixes with byproducts, resulting in a consistent concentration of silicon precursor. Compared to systems that are operated by batch dosing of silicon precursor gas, the porous particles are contacted by a more consistent concentration of silicon precursor throughout the deposition.

As the CVI deposition takes place in a consistent but relatively dilute phase, it is expected to occur at a slower rate compared to systems that are operated by batch dosing of silicon precursor gas, but the degree of control over the deposition reaction is enhanced as gradients of pressure and temperature in the pressure reactor are eliminated, such that the porous particles are exposed to more consistent conditions, including temperature, pressure and concentration of silicon precursor. Increased control of the reaction conditions could result in better control of important properties of the composite particles, including silicon content, surface area and amount of coarse silicon.

Furthermore, the process is believed to result in increased throughput by reducing production downtime associated with fluctuations in pressure and temperature that are inherent in systems that are operated by batch dosing of silicon precursor gas, whilst also enabling the processing of large batches of composite particles.

Operation

The process is operated as continuous with respect to the silicon precursor gas and batch with respect to the porous particles. Therefore the pressure reactor operates as a semi-batch reactor.

The term continuous is used herein to distinguish from batch-type operation. In a batch operation, a batch of the starting material (porous particles) is added to the reactor in a first step, the reaction is allowed to progress for a specified period, and then a batch of product (composite particles) is withdrawn from the reactor. In a continuous operation, the introduction of the starting material (silicon precursor) into the reactor, and optionally the withdrawal of the product (effluent gas), occurs continuously with the reaction in progress.

In principle, continuous operation does not exclude the possibility of deviations in the rate of flow of silicon precursor gas to or effluent gas from the reactor. For instance, a continuous reactor may operate in a pulsed mode. For example, the flow rate of the silicon precursor gas into the pressure reactor may be reduced to aid the withdrawal of effluent gas from the pressure reactor. Alternatively, the silicon precursor gas may be introduced into the pressure reactor at a constant pressure.

Withdrawal of effluent gases may be operated continuously, such that both the supply of the silicon precursor gas and the withdrawal of effluent gas from the reactor occur continuously and simultaneously with the reaction in progress.

Alternatively, withdrawal of the effluent gas from the pressure reactor may be operated semi-continuously. As used herein, semi-continuously means that the effluent gas is removed intermittently.

Semi-continuous withdrawal of the effluent gas from the pressure reactor may be achieved by oscillating the at least one gas outlet of the pressure reactor between an open state and a closed state at a predetermined frequency, such as at least 1 min$^{-1}$, or 2 min$^{-1}$. The at least one gas outlet may be operated at a frequency of no more than 20 min$^{-1}$, or no more than 15 min$^{-1}$, or no more than 10 min$^{-1}$.

In addition or alternatively, effluent gas may be withdrawn from the pressure reactor via at least one valve that opens when the pressure within the pressure reactor exceeds a predetermined pressure. The predetermined pressure may be 15000 kPa, or 10000 kPa, or 5000 kPa, or 2000 kPa, or 1900 kPa, or 1800 kPa, or 1700 kPa, or 1600 kPa, or 1500 kPa, or 1400 kPa, or 1300 kPa, or 1200 kPa, or 1100 kPa, or 1000 kPa, or 900 kPa, or 800 kPa, or 700 kPa, or 600 kPa.

In addition or alternatively, effluent gas may be withdrawn from the pressure reactor via a membrane separator that preferentially allows the at least one byproduct gas to exit the pressure reactor and prevents the silicon precursor from exiting the pressure reactor.

The process may comprise the step of: controlling the back-pressure on the pressure reactor. This may be achieved using a flow regulator device to regulate the flow rate of silicon precursor gas. Suitable flow regulator devices include but are not limited to a reverse pressure controller, an orifice or other fast acting mechanism.

The space time of the silicon precursor gas in contact with the porous particles in step (b) may be maintained in the range from 1 to 60 min, or from 2 to 45 min, or from 3 to 30 min, or from 4 to 25 min, or from 5 to 20 min. These space times are thought to be considerably longer than the space time of silicon precursor gas in fluidised bed reactor processes, because in such processes the silicon precursor gas must be supplied at a sufficient velocity to fluidise the porous particles. It is thought that increasing the space time of the silicon precursor gas in contact with the porous particles increases the conversion rate of silicon precursor.

The space time of the silicon precursor gas in the pressure reactor is calculated as the reactor volume in litres divided by the flow rate of silicon precursor gas (total gas including silicon precursor and any diluting gases) into the pressure reactor in l/min at process conditions.

The space velocity of the silicon precursor, based on the reactor volume, during step (b) may be at least 0.02 min$^{-1}$, or at least 0.025 min$^{-1}$, or at least 0.03 min$^{-1}$, or at least 0.035 min$^{-1}$, or at least 0.04 min$^{-1}$, or at least 0.045 min$^{-1}$, or at least 0.05 min$^{-1}$, or at least 0.06 min$^{-1}$, or at least 0.07 min$^{-1}$, or at least 0.08 min$^{-1}$, or at least 0.09 min$^{-1}$, or at least 0.1 min$^{-1}$, or at least 0.15 min$^{-1}$, or at least 0.2 min$^{-1}$, or at least 0.25 min$^{-1}$, or at least 0.3 min$^{-1}$, or at least 0.35 min$^{-1}$, or at least 0.4 min$^{-1}$.

The space velocity of the silicon precursor, based on the reactor volume, during step (b) may be no more than 0.8 min$^{-1}$, or no more than 0.75 min$^{-1}$, or no more than 0.7 min$^{-1}$, or no more than 0.65 min$^{-1}$, or no more than 0.6 min$^{-1}$, or no more than 0.55 min$^{-1}$, or no more than 0.5 min$^{-1}$. These space velocities are thought to be considerably lower than the space velocity of silicon precursor gas in fluidised bed reactor processes, because in such processes the silicon precursor gas must be supplied at a sufficient velocity to fluidise the porous particles.

The space velocity of the silicon precursor based on the reactor volume is calculated as the flow rate of silicon precursor into the pressure reactor in l/min at process conditions divided by the reactor volume in litres. If the silicon precursor is used in dilution, then space velocity of the silicon precursor based on the reactor volume is calculated as [the flow rate of silicon precursor gas (total gas including silicon precursor and any diluting gases) into the pressure reactor in l/min at process conditions, divided by the reactor volume in litres] multiplied by the volume fraction (vol %) of the silicon precursor in the silicon precursor gas being introduced into the pressure reactor.

It is preferred that the conditions in step (b) include a combination of controlled space time of the silicon precursor gas in contact with the porous particles and space velocity of the silicon precursor based on the reactor volume. This combination defines a set of conditions in which the time that the silicon precursor is in contact with the porous particles is increased (e.g., compared to fluidised bed reactors), thus increasing the conversion rate of silicon precursor.

The space time of the silicon precursor gas in contact with the porous particles in step (b) may be maintained in the range from 1 to 60 min and the space velocity of the silicon precursor, based on the reactor volume, during step (b) may be at least 0.02 min$^{-1}$.

The space time of the silicon precursor gas in contact with the porous particles in step (b) may be maintained in the range from 2 to 45 min and the space velocity of the silicon precursor, based on the reactor volume, during step (b) may be at least 0.025 min$^{-1}$.

The space time of the silicon precursor gas in contact with the porous particles in step (b) may be maintained in the range from 3 to 30 min and the space velocity of the silicon precursor, based on the reactor volume, during step (b) may be at least 0.03 min$^{-1}$.

The space time of the silicon precursor gas in contact with the porous particles in step (b) may be maintained in the range from 4 to 25 min and the space velocity of the silicon precursor, based on the reactor volume, during step (b) may be at least 0.035 min$^{-1}$.

The space time of the silicon precursor gas in contact with the porous particles in step (b) may be maintained in the range from 5 to 20 min and the space velocity of the silicon precursor, based on the reactor volume, during step (b) may be at least 0.04 min$^{-1}$.

The process may comprise the steps of: discontinuing deposition of the silicon; and withdrawing the composite particles from the pressure reactor. Discontinuing deposition of the silicon may comprise discontinuing the introduction of the silicon precursor gas into the pressure reactor; and/or reducing the pressure in the pressure reactor to less than 50 kPa, or less than 40 kPa, or less than 30 kPa, or less than 20 kPa, or less than 10 kPa, or less than 5 kPa, or less than 3 kPa, or less than 2 kPa, or less than 1 kPa.

Step (b) may comprise agitating the porous particles. Preferably step (b) comprises continuously agitating the porous particles. Preferably step (b) comprises mechanically agitating the porous particles. Preferably step (b) comprises continuously mechanically agitating the porous particles. Preferably agitating is carried out by a high shear mixer.

Preferably the pressure reactor comprises an agitator for agitating the porous particles during said contacting. Any suitable agitator may be used, such as a turbine agitator, a paddle agitator, an anchor agitator, a propeller agitator, or a helical agitator. It is preferred that the agitator is a high shear mixer.

Mechanically agitating the porous particles decouples the silicon precursor gas supply from agitation of the porous particles. With a fluidised bed reactor, agitation of the porous particles can only be achieved by supplying the silicon precursor gas at a sufficient velocity to fluidise the porous particles. In consequence, the use of mechanical agitation enables the process to function with lower silicon precursor gas velocity than fluidised bed reactor processes and allows the space time of the silicon precursor to be adjusted independently from agitation.

Continuous mechanical agitation allows increased porous particle loading per litre of the reactor whilst maintaining homogenous silicon deposition. In technologies reliant on a relatively high ratio of reactor surface area to mass of porous particles, a temperature gradient exists across the porous particle bed thickness, thus limiting the effective porous particle bed thickness at which the silicon infiltration is homogenous. As a result, the maximum powder bed thickness and porous particle loading is limited. In a continuously mechanically agitated system, the continuous movement and recirculation of the porous particles within the reactor allows for a higher quantity of porous particles to contact the reactor surface, homogeneity of heat transfer is improved, and the porous particles have a reduced temperature gradient. This allows for a greater porous particle loading per reactor volume.

The use of a high shear mixer provides continuous mechanical agitation and effectively breaks up agglomerates which form naturally due to the cohesive nature of the porous particles. Therefore, both heat and mass transfer challenges are addressed.

The temperature in the pressure reactor during step (b) is preferably in the range from 340 to 500° C., or from 350 to 500° C., or from 350 to 480° C., or from 350 to 450° C., or from 350 to 420° C., or from 340 to 400° C., or from 340 to 395° C., or from 340 to 390° C., or from 345 to 400° C., or from 345 to 395° C., or from 345 to 390° C., or from 350 to 400° C., or from 350 to 395° C., or from 350 to 390° C., or from 350 to 385° C., or from 350 to 380° C., or from 355 to 400° C., or from 355 to 395° C., or from 355 to 390° C., or from 355 to 385° C., or from 355 to 380° C., or from 360 to 400° C., or from 360 to 395° C., or from 360 to 390° C., or from 360 to 385° C., or from 360 to 380° C., or from 365 to 400° C., or from 365 to 395° C., or from 365 to 390° C., or from 365 to 385° C., or from 365 to 380° C., or from 370 to 400° C., or from 370 to 395° C., or from 370 to 390° C., or from 370 to 385° C., or from 370 to 380° C. Operation at greater temperatures in the pressure reactor will increase the rate of the reaction and lead to faster deposition rate. The temperature in the pressure reactor during step (b) may be at least 340° C., or at least 350° C., or at least 355° C., or at least 360° C. The temperature in the pressure reactor during step (b) may be no more than 500° C., or no more than 480° C., or no more than 450° C., or no more than 420° C., or no more than 400° C., or no more than 395° C., or no more than 390° C., or no more than 385° C., or no more than 380° C.

The process of the invention is preferably operated under a regime where the silicon precursor is supplied to the pressure reactor at high concentration, or even in neat form. In order to control the rate of reaction and to achieve controlled infiltration of the silicon precursor into the pore network of the porous particles, the reaction temperature in the pressure reactor is preferably no more than 420° C., more preferably no more than 410° C., more preferably no more than 400° C., more preferably no more than 395° C. A temperature range of from 370 to 395° C. is particularly preferred.

All pressure values disclosed herein are absolute pressures unless specified otherwise. The conditions in step (b) may include a pressure in the range from 50 to 15000 kPa, or from 50 to 10000 kPa, or from 120 to 5000 kPa, or from 150 to 2000 kPa, or from 200 to 1600 kPa, or from 250 to 1500 kPa, or from 300 to 1200 kPa, or from 400 to 1000 kPa, or from 500 to 900 kPa, or from 600 to 800 kPa.

The pressure in the pressure reactor during step (b) may be in the range from 50 to 15000 kPa, or from 50 to 10000 kPa, or from 50 to 5000 kPa, or from 50 to 2000 kPa, or from 50 to 1600 kPa, or from 50 to 1000 kPa, or from 50 to 700 kPa, or from 100 to 700 kPa, or from 100 to 600 kPa.

Preferably, the pressure in the pressure reactor during step (b) is in the range from 600 to 15000 kPa, or from 600 to 10000 kPa, or from 600 to 5000 kPa, or from 600 to 2000 kPa, or from 600 to 1600 kPa.

Preferably, the pressure in the pressure reactor during step (b) is in the range from 700 to 15000 kPa, or from 700 to 10000 kPa, or from 700 to 5000 kPa, or from 700 to 2000 kPa, or from 700 to 1600 kPa.

Preferably, the pressure in the pressure reactor during step (b) is in the range from 1000 to 15000 kPa, or from 1000 to 10000 kPa, or from 1000 to 5000 kPa, or from 1000 to 2000 kPa, or from 1000 to 1600 kPa.

Preferably, the pressure in the pressure reactor during step (b) is in the range from 150 to 15000 kPa, or from 150 to 10000 kPa, or from 150 to 5000 kPa, or from 150 to 2000 kPa, or from 150 to 1900 kPa, or from 150 to 1800 kPa, or from 150 to 1700 kPa, or from 150 to 1600 kPa, or from 150 to 1500 kPa, or from 150 to 1400 kPa, or from 150 to 1300 kPa, or from 150 to 1200 kPa, or from 150 to 1100 kPa, or from 150 to 1000 kPa, or from 150 to 700 kPa, or from 150 to 600 kPa.

Preferably, the pressure in the pressure reactor during step (b) is in the range from 200 to 5000 kPa, or from 200 to 4000 kPa, or from 200 to 3000 kPa, or from 200 to 2000 kPa, or from 600 to 1800 kPa, or from 700 to 1800 kPa.

Preferably, the pressure in the pressure reactor during step (b) is in the range from 500 to 3000 kPa, or from 600 to 3000 kPa, or from 700 to 3000 kPa, or from 1000 to 3000 kPa.

Preferably, the pressure in the pressure reactor during step (b) is in the range from 1300 to 1700 kPa, or from 1400 to 1600 kPa, or from 1450 to 1550 kPa, or from 1475 to 1525 kPa.

The pressure in the pressure reactor during step (b) may be at least 50 kPa, or at least 100 kPa, or at least 150 kPa, or at least 200 kPa, or at least 250 kPa, or at least 300 kPa, or at least 400 kPa, or at least 500 kPa, or at least 600 kPa, or at least 700 kPa, or at least 800 kPa, or at least 900 kPa, or at least 1000 kPa. Preferably, the pressure in the pressure reactor during step (b) is at least 600 kPa, or at least 700 kPa, or at least 1000 kPa.

The pressure in the pressure reactor during step (b) may be no more than 15000 kPa, or no more than 10000 kPa, or no more than 5000 kPa, or no more than 4000 kPa, or no more than 3000 kPa, or no more than 2000 kPa, or no more than 1900 kPa, or no more than 1800 kPa, or no more than 1700 kPa, or no more than 1600 kPa, or no more than 1500 kPa, or no more than 1400 kPa, or no more than 1300 kPa, or no more than 1200 kPa, or no more than 1100 kPa, or no more than 1000 kPa, or no more than 700 kPa, or no more than 600 kPa. Preferably, the pressure in the pressure reactor during step (b) is no more than 15000 kPa, or no more than 10000 kPa, or no more than 5000 kPa, or no more than 2000 kPa, or no more than 1600 kPa.

Operation at elevated pressure has the advantage that mass transfer limitations on the reaction rate are reduced, facilitating infiltration of the silicon precursor gas into the pore network of the porous particles. Operating at greater pressures also increases the residence time of the silicon precursor gas, thus increasing conversion of the silicon precursor. Operation at too great a pressure has the disadvantage that pressure negatively affects the thermodynamic equilibrium of silicon decomposition, thus limiting the extent of the reaction. Operation at a pressure below 700 kPa has the advantage that specialist apparatus is not required, thus reducing costs.

To prevent uncontrolled reaction, the temperature in the pressure reactor is preferably reduced as the pressure is increased. In particular, where the pressure in the pressure reactor is above 100 kPa, the reaction temperature in the pressure reactor is preferably no more than 450° C., more preferably no more than 430° C., more preferably no more than 420° C., more preferably no more than 410° C., more preferably no more than 400° C., more preferably no more than 395° C.

Preferably, the temperature in the pressure reactor during step (b) is in the range from 340 to 500° C. and the pressure in the pressure reactor during step (b) is in the range from 600 to 5000 kPa.

Preferably, the temperature in the pressure reactor during step (b) is in the range from 360 to 390° C. and the pressure in the pressure reactor during step (b) is in the range from 600 to 2000 kPa.

Preferably, the temperature in the pressure reactor during step (b) is in the range from 360 to 385° C. and the pressure in the pressure reactor during step (b) is in the range from 700 to 2000 kPa.

Preferably, the temperature in the pressure reactor during step (b) is in the range from 360 to 380° C. and the pressure in the pressure reactor during step (b) is in the range from 1000 to 2000 kPa.

During step (b), the mole fraction of silicon precursor in the pressure reactor may be maintained in the range from 0.2 to 0.8 by total moles of gaseous compounds in the pressure reactor, or from 0.3 to 0.7, or from 0.4 to 0.6 based on total moles of gaseous compounds in the pressure reactor.

The process may further comprise the step of: increasing or decreasing the flow rate of silicon precursor gas and/or the flow rate of effluent gas, during said contacting.

Control over the flow rate of silicon precursor gas and/or effluent gas may be achieved using Coriolis flow meters and controllers, or other mass flow controllers where the mass flow rate is measured and used to control the gas flow rate.

Suitable valves for controlling flow rate include but are not limited to needle valves, diaphragm valves and glove valves.

The linear gas velocity of the silicon precursor gas in the pressure reactor in step (b) may be maintained in the range from 0.001 m/min to 0.4 m/min, or from 0.005 m/min to 0.4 m/min, or from 0.01 to 0.4 m/min, or from 0.02 to 0.4 m/min, or from 0.03 to 0.4 m/min, or from 0.04 to 0.4 m/min, or from 0.05 to 0.4 m/min, or from 0.06 to 0.4 m/min, or from 0.07 to 0.4 m/min.

The linear gas velocity of the silicon precursor gas is calculated as the flowrate in $m^3$/min of the silicon precursor gas (including silicon precursor and any diluting gases) into the pressure reactor at process conditions divided by the cross-sectional area of the reactor in $m^2$, thus giving units of m/min. In a batch system the linear gas velocity of the silicon precursor gas is assumed to be 0 m/min because the silicon precursor gas is not actively flowing through the reactor (flow rate=0 l/min). Fluidised bed reactors generally require much greater linear gas velocities than those described above because of the minimum velocity required to fluidise the porous particle bed.

Step (b) may comprise decreasing the flow rate of the silicon precursor into the pressure reactor.

Step (b) may comprise adjusting the flow rate of the silicon precursor into the pressure reactor from an initial flow rate to an adjusted flow rate, wherein the adjusted flow rate is greater than or less than the initial flow rate.

Step (c) may comprise measuring the concentration of silicon precursor in the effluent gas; detecting a change in the concentration of the silicon precursor in the effluent gas; and adjusting the flow rate of the silicon precursor into the pressure reactor in step (b) in response to the detected change in the concentration of silicon precursor in the effluent gas.

Step (c) may comprise detecting an increase in the concentration of the silicon precursor in the effluent gas and reducing the flow rate of the silicon precursor into the pressure reactor in step (b) in response to the detected increase in the concentration of silicon precursor in the effluent gas. The silicon precursor may be silane.

Step (c) may comprise measuring the concentration of a by-product gas in the effluent gas; detecting a change in the concentration of the by-product gas in the effluent gas; and adjusting the flow rate of the silicon precursor into the pressure reactor in step (b) in response to the detected change in the concentration of the by-product gas in the effluent gas.

Step (c) may comprises detecting a decrease in the concentration of a by-product gas in the effluent gas and reducing the flow rate of the silicon precursor into the pressure reactor in step (b) in response to the detected decrease in the concentration of the by-product gas in the effluent gas, optionally wherein the by-product gas is hydrogen. The by-product gas may be hydrogen. For example, when the silicon precursor is silane, disilane or trisilane, the deposition reaction produces hydrogen ($H_2$) as a by-product.

Techniques for measuring the concentration of silicon precursor and by-product gas in gases are known to those skilled in the art. For example, FT-IR may be used.

Both the concentration of the silicon precursor and the concentration of the by-product gas in the effluent gas may be measured and the flow rate of the silicon precursor into the pressure reactor may be adjusted accordingly.

The flow rate of the silicon precursor into the pressure reactor may be reduced by at least 10%, or by at least 20%, or by at least 30%, or by at least 40%, or by at least 50%, or by at least 60%, or by at least 70%, or by at least 80%, or by at least 90%.

The flow rate of the silicon precursor into the pressure reactor may be reduced after 50% of the target mass of silicon has been deposited, or after 60% of the target mass of silicon has been deposited, or after 70% of the target mass of silicon has been deposited, or after 80% of the target mass of silicon has been deposited, or after 90% of the target mass of silicon has been deposited.

The absolute pressure in the reactor may be kept constant while reducing the flow rate of the silicon precursor into the pressure reactor.

As the silicon CVI progresses the available pore volume for silicon deposition in the porous particles reduces. It is believed that deposition of coarse silicon is affected by the ratio of silicon precursor concentration and available pore volume for deposition. In consequence, if the flow rate of the silicon precursor is kept constant during the silicon CVI as the available pore volume decreases there may be increased formation of coarse silicon. It is therefore preferred to decrease the flow rate of the silicon precursor as the silicon CVI progresses.

The mole fraction of silicon precursor in the pressure reactor during step (b) may be maintained in the range from 0.2 to 0.8, or from 0.3 to 0.7, or from 0.4 to 0.6 based on total moles of gaseous compounds in the pressure reactor.

The process may further comprise the step of: controlling the flow rate of the silicon precursor gas into the pressure reactor and/or the flow rate of the effluent gas withdrawn from the pressure reactor during said contacting in order to maintain the mole fraction of silicon precursor in the pressure reactor, optionally in the range from 0.2 to 0.8 by total moles of gaseous compounds in the pressure reactor, or from 0.3 to 0.7, or from 0.4 to 0.6 by total moles of gaseous compounds in the pressure reactor.

The process may further comprise the step of: controlling the flow rate of the silicon precursor gas into the pressure reactor and/or the flow rate of the effluent gas withdrawn from the pressure reactor during said contacting in order to maintain the pressure in the pressure reactor, optionally in the range from 50 to 15000 kPa, or from 50 to 10000 kPa, or from 50 to 5000 kPa, or from 50 to 2000 kPa, or from 50 to 1600 kPa, or from 50 to 1000 kPa, or from 50 to 700 kPa, or from 100 to 700 kPa, or from 100 to 600 kPa.

The process may further comprise the step of, during said contacting: (i) controlling the flow rate of the silicon precursor gas into the pressure reactor; and/or (ii) controlling the flow rate of the effluent gas withdrawn from the pressure reactor; to maintain the pressure in the pressure reactor in the range from 150 to 15000 kPa, or from 150 to 10000 kPa, or from 150 to 5000 kPa, or from 150 to 2000 kPa, or from 150 to 1900 kPa, or from 150 to 1800 kPa, or from 150 to 1700 kPa, or from 150 to 1600 kPa, or from 150 to 1500 kPa, or from 150 to 1400 kPa, or from 150 to 1300 kPa, or from 150 to 1200 kPa, or from 150 to 1100 kPa, or from 150 to 1000 kPa, or from 150 to 700 kPa, or from 150 to 600 kPa.

Preferably, the process comprises the step of: controlling the flow rate of the silicon precursor gas into the pressure reactor and/or the flow rate of the effluent gas withdrawn from the pressure reactor during said contacting in order to maintain the pressure in the pressure reactor in the range from 600 to 15000 kPa, or from 600 to 10000 kPa, or from 600 to 5000 kPa, or from 600 to 2000 kPa, or from 600 to 1600 kPa.

Preferably, the process comprises the step of: controlling the flow rate of the silicon precursor gas into the pressure reactor and/or the flow rate of the effluent gas withdrawn from the pressure reactor during said contacting in order to maintain the pressure in the pressure reactor in the range from 700 to 15000 kPa, or from 700 to 10000 kPa, or from 700 to 5000 kPa, or from 700 to 2000 kPa, or from 700 to 1600 kPa.

Preferably, the process comprises the step of: controlling the flow rate of the silicon precursor gas into the pressure reactor and/or the flow rate of the effluent gas withdrawn from the pressure reactor during said contacting in order to maintain the pressure in the pressure reactor in the range from 1000 to 15000 kPa, or from 1000 to 10000 kPa, or from 1000 to 5000 kPa, or from 1000 to 2000 kPa, or from 1000 to 1600 kPa.

In another embodiment, the process comprises the step of: controlling the flow rate of the silicon precursor gas into the pressure reactor and/or the flow rate of the effluent gas withdrawn from the pressure reactor during said contacting in order to maintain the pressure in the pressure reactor in the range from 1300 to 1700 kPa, or from 1400 to 1600 kPa, or from 1450 to 1550 kPa, or from 1475 to 1525 kPa.

During said contacting, the ratio of flow rate of silicon in the silicon precursor gas into the pressure reactor in grams per minute to mass of porous particles in the pressure reactor in grams may be in the range from 0.006 to 0.7.

During said contacting, the ratio of flow rate of silicon in the silicon precursor gas into the pressure reactor in grams per minute to mass of porous particles in the pressure reactor in grams may be in the range from 0.006 to 0.008. These ratios have the advantage that the conversion of silicon precursor is high compared to greater ratios. A high level of conversion of the silicon precursor is thought to help obtain a composite particle with low coarse silicon formation. However, at lower ratios the reaction time is unacceptably long.

Alternatively, during said contacting, the ratio of flow rate of silicon in the silicon precursor gas into the pressure reactor in grams per minute to mass of porous particles in the pressure reactor in grams may be in the range from 0.01 to 0.7. These ratios have the advantage that an excess of the silicon precursor is maintained in the pressure reactor. In the equilibrium between silicon precursor and silicon+by-product(s), a high silicon precursor concentration pushes the equilibrium towards the deposition of silicon. As discussed above, at greater pressures in the pressure reactor the rate of deposition of silicon is reduced. Maintaining an excess of silicon precursor in the pressure reactor compensates for the reduced rate of deposition of silicon at greater pressures, thus affording the advantages of operation at greater pressures whilst maintaining the rate of deposition of silicon. This will also help to reduce synthesis time.

During said contacting, the ratio of flow rate of silicon in the silicon precursor gas into the pressure reactor in grams per minute to (mass of porous particles in the pressure reactor in grams×internal free volume of the reactor in litres) may be in the range from 0.0002 to 0.025. During said contacting, the ratio of flow rate of silicon in the silicon precursor gas into the pressure reactor in grams per minute to (mass of porous particles in the pressure reactor in grams×internal free volume of the reactor in litres) may be in the range from 0.0002 to 0.0003. Alternatively, during said contacting, the ratio of flow rate of silicon in the silicon precursor gas into the pressure reactor in grams per minute to (mass of porous particles in the pressure reactor in grams×internal free volume of the reactor in litres) may be in the range from 0.0004 to 0.025. The internal free volume of the reactor refers to that volume free of any internal elements.

The described ratios of flow rate of silicon in the silicon precursor gas into the pressure reactor to mass of porous particles in the pressure reactor and/or flow rate of silicon in the silicon precursor gas in grams per minute to (mass of porous particles in the pressure reactor in grams×internal free volume of the reactor in litres) may be maintained throughout step (b).

Alternatively, the process may further comprise the step of: adjusting:
(i) the ratio of flow rate of silicon in the silicon precursor gas into the pressure reactor in grams per minute to mass of porous particles in the pressure reactor in grams, and/or
(ii) the ratio of flow rate of silicon in the silicon precursor gas into the pressure reactor in grams per minute to (mass of porous particles in the pressure reactor in grams×internal free volume of the reactor in litres).

The process may comprise the step of: adjusting after a predetermined period, during said contacting:
(i) the ratio of flow rate of silicon in the silicon precursor gas into the pressure reactor in grams per minute to mass of porous particles in the pressure reactor in grams, and/or
(ii) the ratio of flow rate of silicon in the silicon precursor gas into the pressure reactor in grams per minute to (mass of porous particles in the pressure reactor in grams×internal free volume of the reactor in litres)
to provide a ratio described above.

The composite particles provided in step (b) may comprise a target amount of silicon that occupies from 20% to 95% of the internal pore volume of the porous particle framework, and the predetermined period may be after the composite particles comprise an amount of silicon that is from 50% to 95% of the target amount, or from 60% to 95%, or from 70% to 95%, or from 80% to 95%, or from 90 to 95% of the target amount. The target amount of silicon may occupy from 20% to 80%, or from 20% to 70%, or from 30% to 70%, or from 30% to 60% of the internal pore volume of the porous particle framework.

The ratios may be adjusted throughout step (b), for example by adjusting the flow rate of silicon precursor gas. For example, step (b) may be operated for a period wherein the ratio of flow rate of silicon in the silicon precursor gas into the pressure reactor to mass of porous particles in the pressure reactor is outside the range of 0.006 to 0.7. Thereafter, during step (b), the ratio of flow rate of silicon in the silicon precursor gas into the pressure reactor to mass of porous particles in the pressure reactor may be adjusted to be within the range of 0.006 to 0.7.

Preferably, the pressure reactor is operated such that consumption of the silicon precursor is at least 20%, preferably at least 50%, preferably at least 60%, preferably at least 80%, preferably at least 90%. Alternatively, the pressure reactor may be operated in a low conversion mode wherein consumption of the silicon precursor is no more than 20%, preferably no more than 10%, more preferably no more than 5%.

The composite particles withdrawn from the pressure reactor may comprise from 0.2 to 1.8 grams of silicon per gram of the porous particle framework.

The composite particles provided in step (b) may comprise an amount of silicon that occupies from 20% to 95% of the internal pore volume of the porous particle framework, or from 20% to 80%, or from 20% to 70%, or from 30% to 70%, or from 30% to 60% of the internal pore volume of the porous particle framework. Silicon occupancy may be calculated using the equation 100×(density of silicon×weight % of silicon in the composite particle)/pore volume of porous particle. The density of silicon is assumed to be 2.3 g/cm³ for this purpose.

It is not excluded that unreacted silicon precursor gas may be recovered from the effluent gas withdrawn from the pressure reactor and recycled into the pressure reactor.

The effluent gas from the pressure reactor comprises at least one by-product gas from the CVI reaction and optionally unreacted silicon precursor. The effluent gas may comprise silicon precursor, at least one byproduct gas and optionally other gases such as hydrogen or an inert gas, such as nitrogen or argon. Preferably, the content of silicon precursor in the effluent gas from the pressure reactor is at least 5%, at least 10 vol %, or at least 15 vol %, or at least 20 vol %, or at least 50 vol %, or at least 85 vol %. The effluent gas may comprise from 2.5 to 80 vol % of the silicon precursor, or from 2.5 to 70 vol %, or from 2.5 to 60 vol %, or from 2.5 to 50 vol %, or from 5 to 80 vol %, or from 5 to 70 vol %, or from 5 to 60 vol %, or from 5 to 50 vol % of the silicon precursor. Controlling the pressure reactor such that the effluent gas comprises unreacted silicon precursor may be preferable as it ensures that a high concentration of silicon precursor can be maintained throughout the pressure reactor. In the case that the effluent gas from the pressure reactor contains significant quantities of unreacted silicon precursor, it may be appropriate to recover the unreacted silicon precursor from the effluent gas and to recycle the recovered silicon precursor to the pressure reactor. Means of recovering the unreacted silicon precursor from the effluent gas include semi-permeable membrane separation processes, pressure-swing absorption processes, and cryogenic separation processes.

Optionally, silicon precursor gas is pre-heated before it is introduced into the pressure reactor. Preferably, the silicon precursor gas is pre-heated to a temperature that is $\geq(T_{RZ}-200)$ ° C., wherein $T_{RZ}$ is the reaction temperature of the pressure reactor, preferably to a temperature that is $\geq(T_{RZ}-100)$° C., more preferably to a temperature that is $\geq(T_{RZ}-50)$° C.

Step (b) may comprise contacting the plurality of porous particles with the silicon precursor gas at conditions effective to cause deposition of silicon in the pores of the porous particles to provide composite particles comprising from 30 to 70 wt % of silicon based on the total mass of the composite particles.

The composite particles formed in step (b) may comprise at least 26 wt % silicon, or at least 28 wt % silicon, or at least 30 wt % silicon, or at least 32 wt % silicon, or at least 34 wt % silicon, or at least 36 wt % silicon, or at least 38 wt % silicon, or at least 40 wt % silicon, or at least 42 wt % silicon, or at least 44 wt % silicon.

The composite particles formed in step (b) may comprise no more than 62 wt % silicon, or no more than 60 wt % silicon, or no more than 58 wt % silicon, or no more than 56 wt % silicon, or no more than 54 wt % silicon.

The composite particles provided in step (b) preferably have a BET surface area of no more than 100 m²/g, or no more than 80 m²/g, or no more than 60 m²/g, or no more than 40 m²/g, or no more than 30 m²/g, or no more than 25 m²/g, or no more than 20 m²/g, or no more than 15 m²/g, or no more than 10 m²/g. In general, a low BET surface area is preferred in order to minimize the formation of solid electrolyte interphase (SEI) layers at the surface of the composite particles during the first charge-discharge cycle of an anode. However, a BET surface area which is excessively low results in unacceptably low charging rate and capacity due to the inaccessibility of the bulk of the electroactive material to metal ions in the surrounding electrolyte. For instance, the BET surface area of the composite particles is preferably at least 0.1 m²/g, or at least 1 m²/g, or at least 2 m²/g, or at least 5 m²/g. For instance, the BET surface area may be in the range from 0.1 to 100 m²/g, or from 0.1 to 80 m²/g, or from 0.5 to 60 m²/g, or from 0.5 to 40 m²/g, or from 1 to 30 m²/g, or from 1 to 25 m²/g, or from 2 to 20 m²/g. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277.

The composite particles can be characterised by their performance under thermogravimetric analysis (TGA) in air. This method of analysis relies on the principle that a weight gain is observed when electroactive materials are oxidized in air and at elevated temperature.

As defined herein, "surface silicon" is calculated from the initial mass increase in the TGA trace from a minimum between 150° C. and 500° C. to the maximum mass measured in the temperature range between 550° C. and 650° C., wherein the TGA is carried out in air with a temperature ramp rate of 10° C./min. This mass increase is assumed to result from the oxidation of surface silicon and therefore allows the percentage of surface silicon as a proportion of the total amount of silicon to be determined according to the following formula:

$$Y = 1.875 \times [(M_{max} - M_{min})/M_f] \times 100\%$$

Wherein Y is the percentage of surface silicon as a proportion of the total silicon in the sample, $M_{max}$ is the maximum mass of the sample measured in the temperature range between 550° C. to 650° C., $M_{min}$ is the minimum mass of the sample above 150° C. and below 500° C., and $M_f$ is the mass of the sample at completion of oxidation at 1400° C. For completeness, it will be understood that 1.875 is the molar mass ratio of $SiO_2$ to $O_2$ (i.e. the mass ratio of $SiO_2$ formed to the mass increase due to the addition of oxygen). Typically, the TGA analysis is carried out using a sample size of 10 mg±2 mg.

It has been found that reversible capacity retention over multiple charge/discharge cycles is considerably improved when the surface silicon as determined by the TGA method described above is at least 20 wt % of the total amount of silicon in the material.

The composite particles provided in step (b) preferably comprise at least 20 wt % of the total amount of silicon as surface silicon. Or, at least 22 wt %, or at least 25 wt %, at least 30 wt % of the silicon, or at least 35 wt % of the silicon, or at least 40 wt % of the silicon, or at least 45 wt % of the silicon is surface silicon as determined by TGA.

The composite particles provided in step (b) preferably have a low content of coarse bulk silicon as determined by TGA. Coarse bulk silicon is defined herein as silicon which undergoes oxidation above 800° C. as determined by TGA, wherein the TGA is carried out in air with a temperature ramp rate of 10° C./min. The coarse bulk silicon content is therefore determined according to the following formula:

$$Z = 1.875 \times [(M_f - M_{800})/M_f] \times 100\%$$

Wherein Z is the percentage of unoxidized silicon at 800° C., $M_{800}$ is the mass of the sample at 800° C., and $M_f$ is the mass of ash at completion of oxidation at 1400° C. For the purposes of this analysis, it is assumed that any mass increase above 800° C. corresponds to the oxidation of silicon to $SiO_2$ and that the total mass at completion of oxidation is $SiO_2$. Typically, the TGA analysis is carried out using a sample size of 10 mg±2 mg.

Silicon that undergoes oxidation above 800° C. is less desirable. Preferably, no more than 10 wt %, or no more than 8 wt %, or no more than 6 wt %, or no more than 5 wt %, or no more than 4 wt %, or no more than 3 wt %, or no more than 2 wt %, or no more than 1.5 wt % of the silicon is coarse bulk silicon as determined by TGA.

Preferably, at least 20 wt % of the silicon is surface silicon and no more than 10 wt % of the silicon is coarse bulk silicon, wherein both are determined by TGA. More preferably, at least 30 wt % of the silicon is surface silicon and no more than 10 wt % of the silicon is coarse bulk silicon, wherein both are determined by TGA. More preferably, at least 35 wt % of the silicon is surface silicon and no more than 8 wt % of the silicon is coarse bulk silicon, wherein both are determined by TGA. More preferably, at least 40 wt % of the silicon is surface silicon and no more than 5 wt % of the silicon is coarse bulk silicon, wherein both are determined by TGA. More preferably, at least 45 wt % of the silicon is surface silicon and no more than 2 wt % of the silicon is coarse bulk silicon, wherein both are determined by TGA.

The plurality of porous particles in the pressure reactor in step (a) may be a charge of porous particles having a volume of at least 20 g per litre of reactor volume (g/$L_{RV}$), or at least 50 g/$L_{RV}$, or at least 80 g/$L_{RV}$, or at least 100 cm³/$L_{RV}$, or at least 150 cm³/$L_{RV}$, or at least 200 cm³/$L_{RV}$, or at least 250 cm³/$L_{RV}$, or at least 300 cm³/$L_{RV}$, or at least 400 cm³/$L_{RV}$, or at least 500 cm³/$L_{RV}$, or at least 600 cm³/$L_{RV}$, or at least 700 cm³/$L_{RV}$, or at least 800 cm³/$L_{RV}$, or at least 900 cm³/$L_{RV}$.

Preferably, the charge of porous particles used in step (a) is at least 500 cm³/$L_{RV}$ and in some embodiments is optionally sufficient so as to substantially fill the reactor volume of the pressure reactor.

As used herein, the volume of the porous particles refers to the equivalent mass of the porous particles as determined from the tap density. For example, a particle volume of 200 cm³ of a porous particle material having a tap density of 1000 g/L as defined herein is equivalent to 200 g of the porous particle material.

The flow rate of the silicon precursor gas into the pressure reactor in grams of silicon per minute per kilogram of porous particles may be from 0.2 to 25 gmin⁻¹kg⁻¹, or from 0.5 to 20 gmin⁻¹kg⁻¹, or from 1 to 15 gmin⁻¹kg⁻¹, or from 1 to 14 gmin⁻¹kg⁻¹, or from 1 to 13 gmin⁻¹kg⁻¹, or from 1 to 12 gmin⁻¹kg⁻¹, or from 2 to 12 gmin⁻¹kg⁻¹, or from 3 to 12 gmin⁻¹kg⁻¹, or from 3 to 11 gmin⁻¹kg⁻¹.

The flow rate of the silicon precursor gas into the pressure reactor in grams of silicon per minute per litre of reactor volume (gmin⁻¹/$L_{RV}$) may be from 0.03 to 40 gmin⁻¹/$L_{RV}$, or from 0.04 to 35 gmin⁻¹/$L_{RV}$, or from 0.05 to 30 gmin⁻¹/$L_{RV}$, or from 0.06 to 25 gmin⁻¹/$L_{RV}$, or from 0.07 to 20 gmin⁻¹/$L_{RV}$, or from 0.08 to 15 gmin⁻¹/$L_{RV}$, or from 0.09 to 10 gmin⁻¹/$L_{RV}$, or from 0.1 to 5 gmin⁻¹/$L_{RV}$, or from 0.1 to 1 gmin⁻¹/$L_{RV}$, or from 0.15 to 1 gmin⁻¹/$L_{RV}$, or from 0.15 to 0.95 gmin⁻¹/$L_{RV}$, or from 0.2 to 0.95 gmin⁻¹/$L_{RV}$, or from 0.2 to 0.9 gmin⁻¹/$L_{RV}$.

The ratio of the internal surface area of the pressure reactor to mass of porous particles in the pressure reactor may be no more than 1 m²/kg, or no more than 0.9 m²/kg, or no more than 0.8 m²/kg, or no more than 0.7 m²/kg, or no more than 0.6 m²/kg, or no more than 0.5 m²/kg, or no more than 0.4 m²/kg, or no more than 0.3 m²/kg.

The ratio of the internal surface area of the pressure reactor to mass of porous particles in the pressure reactor may be at least 0.001 m²/kg, or at least 0.002 m²/kg, or at least 0.003 m²/kg, or at least 0.004 m²/kg, or at least 0.006 m²/kg, or at least 0.008 m²/kg, or at least 0.01 m²/kg.

The bed depth of the porous particles in the pressure reactor may be at least 11 cm, or at least 15 cm, or at least 20 cm, or at least 25 cm, or at least 30 cm.

It is preferred to combine the aforementioned porous particle volumes per litre of pressure reactor, ratios of the internal surface area of the pressure reactor to mass of porous particles in the pressure reactor, and/or bed depths of the porous particles in the pressure reactor with continuous agitation as described herein.

The plurality of porous particles in the pressure reactor in step (a) may have a volume of at least 100 cm³/$L_{RV}$ and the bed depth of the porous particles in the pressure reactor may be at least 11 cm.

The plurality of porous particles in the pressure reactor in step (a) may have a volume of at least 200 cm³/$L_{RV}$ and the bed depth of the porous particles in the pressure reactor may be at least 15 cm.

The plurality of porous particles in the pressure reactor in step (a) may have a volume of at least 300 cm³/$L_{RV}$ and the bed depth of the porous particles in the pressure reactor may be at least 20 cm.

The plurality of porous particles in the pressure reactor in step (a) may have a volume of at least 400 cm³/$L_{RV}$ and the bed depth of the porous particles in the pressure reactor may be at least 25 cm.

The plurality of porous particles in the pressure reactor in step (a) may have a volume of at least 500 cm³/$L_{RV}$ and the bed depth of the porous particles in the pressure reactor may be at least 30 cm.

The plurality of porous particles in the pressure reactor in step (a) may have a volume of at least 100 cm³/$L_{RV}$ and the ratio of the internal surface area of the pressure reactor to mass of porous particles in the pressure reactor may be no more than 1 m²/kg.

The plurality of porous particles in the pressure reactor in step (a) may have a volume of at least 200 cm³/$L_{RV}$ and the ratio of the internal surface area of the pressure reactor to mass of porous particles in the pressure reactor may be no more than 0.9 m²/kg.

The plurality of porous particles in the pressure reactor in step (a) may have a volume of at least 300 cm³/$L_{RV}$ and the ratio of the internal surface area of the pressure reactor to mass of porous particles in the pressure reactor may be no more than 0.8 m²/kg.

The plurality of porous particles in the pressure reactor in step (a) may have a volume of at least 400 cm³/$L_{RV}$ and the ratio of the internal surface area of the pressure reactor to mass of porous particles in the pressure reactor may be no more than 0.7 m²/kg.

The plurality of porous particles in the pressure reactor in step (a) may have a volume of at least 500 cm³/$L_{RV}$ and the ratio of the internal surface area of the pressure reactor to mass of porous particles in the pressure reactor may be no more than 0.6 m²/kg.

The plurality of porous particles in the pressure reactor in step (a) may have a volume of at least 600 cm³/$L_{RV}$ and the ratio of the internal surface area of the pressure reactor to mass of porous particles in the pressure reactor may be no more than 0.5 m²/kg.

Porous Particles

The porous particles may comprise micropores and/or mesopores.

The porous particles may have:
(i) a $D_{50}$ particle diameter in the range from 0.5 to 200 µm;
(ii) a total pore volume of micropores and mesopores as measured by gas adsorption in the range from 0.4 to 2.2 cm³/g; and
(iii) a $PD_{50}$ pore diameter as measured by gas adsorption of no more than 30 nm.

The term "particle diameter" as used herein refers to the equivalent spherical diameter (esd), i.e. the diameter of a sphere having the same volume as a given particle, wherein the particle volume is understood to include the volume of any intra-particle pores. The terms "$D_{50}$" and "$D_{50}$ particle diameter" as used herein refer to the volume-based median particle diameter, i.e. the diameter below which 50% by volume of the particle population is found. The terms "$D_{10}$" and "$D_{10}$ particle diameter" as used herein refer to the 10th percentile volume-based median particle diameter, i.e. the diameter below which 10% by volume of the particle population is found. The terms "$D_{90}$" and "$D_{90}$ particle diameter" as used herein refer to the 90th percentile volume-based median particle diameter, i.e. the diameter below which 90% by volume of the particle population is found.

Particle diameters and particle size distributions can be determined by standard laser diffraction techniques in accordance with ISO 13320:2009. Laser diffraction relies on the principle that a particle will scatter light at an angle that varies depending on the size the particle and a collection of particles will produce a pattern of scattered light defined by intensity and angle that can be correlated to a particle size distribution. A number of laser diffraction instruments are commercially available for the rapid and reliable determination of particle size distributions. Unless stated otherwise, particle size distribution measurements as specified or reported herein are as measured by the conventional Malvern Mastersizer™ 3000 particle size analyzer from Malvern Instruments™. The Malvern Mastersizer™ 3000 particle size analyzer operates by projecting a helium-neon gas laser beam through a transparent cell containing the particles of interest suspended in an aqueous solution. Light rays which strike the particles are scattered through angles which are inversely proportional to the particle size and a photodetector array measures the intensity of light at several predetermined angles and the measured intensities at different angles are processed by a computer using standard theoretical principles to determine the particle size distribution. Laser diffraction values as reported herein are obtained using a wet dispersion of the particles in 2-propanol with a 5 vol % addition of the surfactant SPAN™-40 (sorbitan monopalmitate). The particle refractive index is taken to be 2.68 for porous particles and 3.50 for composite particles and the dispersant index is taken to be 1.378. Particle size distributions are calculated using the Mie scattering model.

In general, the porous particles may have a $D_{50}$ particle diameter in the range from 0.5 to 200 µm. Optionally, the $D_{50}$ particle diameter of the porous particles may be at least 1 µm, or at least 1.5 µm, or at least 2 µm, or at least 2.5 µm, or at least 3 µm, or at least 4 µm, or at least 5 µm. Optionally the $D_{50}$ particle diameter of the porous particles may be no more than 150 µm, or no more than 100 µm, or no more than 70 µm, or no more than 50 µm, or no more than 40 µm, or no more than 30 µm, or no more than 25 µm, or no more than 20 µm, or no more than 18 µm, or no more than 15 µm, or no more than 12 µm, or no more than 10 µm, or no more than 8 µm.

For instance, the porous particles may have a $D_{50}$ particle diameter in the range from 0.5 to 150 µm, or from 0.5 to 100 µm, or from 0.5 to 50 µm, or from 0.5 to 30 µm, or from 1 to 25 µm, or from 1 to 20 µm, or from 2 to 25 µm, or from 2 to 20 µm, or from 2 to 18 µm, or from 2 to 15 µm, or from 2 to 12 µm, or from 2.5 to 15 µm, or from 2.5 to 12 µm, or from 2 to 10 µm, or from 3 to 20 µm, or from 3 to 18 µm, or from 3 to 15 µm, or from 4 to 18 µm, or from 4 to 15 µm, or from 4 to 12 µm, or from 5 to 15 µm, or from 5 to 12 µm or from 5 to 10 µm, or from 5 to 8 µm. Particles within these size ranges and having porosity and a pore diameter distribution as set out herein are ideally suited for the preparation of composite particles for use in anodes for metal-ion batteries by a CVI process.

The $D_{10}$ particle diameter of the porous particles is preferably at least 0.2 µm, or at least 0.5 µm, or at least 0.8 µm, or at least 1 µm, or at least 1.5 µm, or at least 2 µm. By maintaining the $D_{10}$ particle diameter at 0.2 µm or more, the potential for undesirable agglomeration of sub-micron sized particles is reduced, and improved dispersibility of the composite particles formed.

The $D_{90}$ particle diameter of the porous particles is preferably no more than 300 µm, or no more than 250 µm, or no more than 200 µm, or no more than 150 µm, or no more than 100 µm, or no more than 80 µm, or no more than 60 µm, or no more than 40 µm, or no more than 30 µm, or no more than 25 µm, or no more than 20 µm.

The porous particles preferably have a narrow size distribution span. For instance, the particle size distribution span (defined as $(D_{90}-D_{10})/D_{50}$) is preferably 5 or less, more preferably 4 or less, more preferably 3 or less, more preferably 2 or less, and most preferably 1.5 or less. By maintaining a narrow size distribution span, efficient packing of the particles in continuous reactors is more readily achievable.

The porous particles may have an average sphericity (as defined herein) of more than 0.5. Preferably they have an average sphericity of at least 0.55, or at least 0.6, or at least 0.65, or at least 0.7, or at least 0.75, or at least 0.8, or at least 0.85. Spherical particles are believed to aid uniformity of deposition and facilitate denser packing of particles, both in continuous reactors and of the final product when incorporated into electrodes.

It is possible to obtain highly accurate two-dimensional projections of micron scale particles by scanning electron microscopy (SEM) or by dynamic image analysis, in which a digital camera is used to record the shadow projected by a particle. The term "sphericity" as used herein shall be understood as the ratio of the area of the particle projection (obtained from such imaging techniques) to the area of a circle, wherein the particle projection and circle have identical circumference. Thus, for an individual particle, the sphericity S may be defined as:

$$S = \frac{4 \cdot \pi \cdot A_m}{(C_m)^2}$$

wherein $A_m$ is the measured area of the particle projection and $C_m$ is the measured circumference of the particle projection. The average sphericity $S_{av}$ of a population of particles as used herein is defined as:

$$S_{av} = \frac{1}{n}\sum_{i=1}^{n}\left[\frac{4\cdot\pi\cdot A_m}{(C_m)^2}\right]$$

wherein n represents the number of particles in the population. The average sphericity for a population of particles is preferably calculated from the two-dimensional projections of at least 50 particles.

The porous particles comprise a three-dimensionally interconnected open pore network comprising micropores and/or mesopores and optionally a minor volume of macropores. In accordance with conventional IUPAC terminology, the term "micropore" is used herein to refer to pores of less than 2 nm in diameter, the term "mesopore" is used herein to refer to pores of 2-50 nm in diameter, and the term "macropore" is used to refer to pores of greater than 50 nm diameter.

References herein to the volume of micropores, mesopores and macropores in the porous particles, and also any references to the distribution of pore volume within the porous particles, relate to the internal pore volume of the porous particles used as the starting material in step (a) of the claimed process, i.e. prior to deposition of silicon into the pore volume in step (c).

The porous particles may comprise a total volume of micropores and mesopores (i.e. the total pore volume in the range from 0 to 50 nm) in the range from 0.4 to 2.2 cm³/g. Typically, the porous particles include both micropores and mesopores. However, it is not excluded that porous particles may be used which include micropores and no mesopores, or mesopores and no micropores.

More preferably, the total volume of micropores and mesopores in the porous particles is at least 0.45 cm³/g, or at least 0.5 cm³/g, at least 0.55 cm³/g, or at least 0.6 cm³/g, or at least 0.65 cm³/g, or at least 0.7 cm³/g, or at least 0.75 cm³/g, or at least 0.8 cm³/g, at least 0.85 cm³/g, or at least 0.9 cm³/g, or at least 0.95 cm³/g, or at least 1 cm³/g. The use of high porosity conductive particles may be advantageous since it allows a larger amount of silicon to be accommodated within the pore structure.

The internal pore volume of the porous particles is suitably capped at a value at which increasing fragility of the porous particles outweighs the advantage of increased pore volume accommodating a larger amount of silicon. Preferably, the total volume of micropores and mesopores in the porous particles is no more than 2 cm³/g, or no more than 1.8 cm³/g, or no more than 1.6 cm³/g, or no more than 1.5 cm³/g, or no more than 1.45 cm³/g, or no more than 1.4 cm³/g, or no more than 1.35 cm³/g, or no more than 1.3 cm³/g, or no more than 1.25 cm³/g, or no more than 1.2 cm³/g, or no more than 1.1, or no more than 1, or no more than 0.95.

In some examples, the total volume of micropores and mesopores in the porous particles may be in the range from 0.45 to 2.2 cm³/g, or from 0.5 to 2 cm³/g, or from 0.55 to 2 cm³/g, or from 0.6 to 1.8 cm³/g, or from 0.65 to 1.8 cm³/g, or from 0.7 to 1.6 cm³/g, or from 0.75 to 1.6 cm³/g, or from 0.8 to 1.5 cm³/g.

In other examples, the total volume of micropores and mesopores in the porous particles may be in the range from 0.55 to 1.4 cm³/g, or from 0.6 to 1.4 cm³/g, or from 0.6 to 1.3 cm³/g, or from 0.65 to 1.3 cm³/g, or from 0.65 to 1.2 cm³/g, or from 0.7 to 1.2 cm³/g, or from 0.7 to 1.1 cm³/g, or from 0.7 to 1 cm³/g, or from 0.75 to 0.95 cm³/g.

In other examples, the total volume of micropores and mesopores in the porous particles may be in the range from 0.4 to 0.75 cm³/g, or from 0.4 to 0.7 cm³/g, or from 0.4 to 0.65 cm³/g, 0.45 to 0.75 cm³/g, or from 0.45 to 0.7 cm³/g, or from 0.45 to 0.65 cm³/g, or from 0.45 to 0.6 cm³/g.

In other examples, the total volume of micropores and mesopores in the porous particles may be in the range from 0.6 to 2 cm³/g, or from 0.6 to 1.8 cm³/g, or from 0.7 to 1.8 cm³/g, or from 0.7 to 1.6 cm³/g, or from 0.8 to 1.6 cm³/g, or from 0.8 to 1.5 cm³/g, or from 0.8 to 1.4 cm³/g, or from 0.9 to 1.5 cm³/g, or from 0.9 to 1.4 cm³/g, or from 1 to 1.4 cm³/g.

The $PD_{50}$ pore diameter of the porous particles may be no more than 30 nm, and optionally no more than 25 nm, or no more than 20 nm, or no more than 15 nm, or no more than 12 nm, or no more than 10 nm, or no more than 8 nm, or no more than 6 nm, or no more than 5 nm, or no more than 4 nm, or no more than 3 nm, or no more than 2.5 nm, or no more than 2 nm, or no more than 1.5 nm. The term "$PD_{50}$ pore diameter" as used herein refers to the volume-based median pore diameter, based on the total volume of micropores and mesopores (i.e. the pore diameter below which 50% of the total micropore and mesopore volume is found). Therefore, in accordance with the invention, at least 50% of the total volume of micropores and mesopores is preferably in the form of pores having a diameter of less than 30 nm.

For the avoidance of doubt, any macropore volume (pore diameter greater than 50 nm) is not taken into account for the purpose of determining $PD_{50}$ values.

The volumetric ratio of micropores to mesopores in the porous particles may range in principle from 100:0 to 0:100. Preferably, the volumetric ratio of micropores to mesopores is from 90:10 to 55:45, or from 90:10 to 60:40, or from 85:15 to 65:35.

The pore size distribution of the porous particles may be monomodal, bimodal or multimodal. As used herein, the term "pore size distribution" relates to the distribution of pore size relative to the cumulative total internal pore volume of the porous particles. A bimodal or multimodal pore size distribution may be preferred since close proximity between micropores and pores of larger diameter provides the advantage of efficient ionic transport through the porous network to the silicon.

The total volume of micropores and mesopores and the pore size distribution of micropores and mesopores are determined using nitrogen gas adsorption at 77 K down to a relative pressure $p/p_0$ of $10^{-6}$ using quenched solid density functional theory (QSDFT) in accordance with standard methodology as set out in ISO 15901-2 and ISO 15901-3. Nitrogen gas adsorption is a technique that characterises the porosity and pore diameter distributions of a material by allowing a gas to condense in the pores of a solid. As pressure increases, the gas condenses first in the pores of smallest diameter and the pressure is increased until a saturation point is reached at which all of the pores are filled with liquid. The nitrogen gas pressure is then reduced incrementally, to allow the liquid to evaporate from the system. Analysis of the adsorption and desorption isotherms, and the hysteresis between them, allows the pore volume and pore size distribution to be determined. Suitable instruments for the measurement of pore volume and pore size distributions by nitrogen gas adsorption include the TriStar II and TriStar II Plus porosity analyzers, which are available from Micromeritics Instrument Corporation, USA, and the Autosorb IQ porosity analyzers, which are available from Quantachrome Instruments.

Nitrogen gas adsorption is effective for the measurement of pore volume and pore size distributions for pores having a diameter up to 50 nm, but is less reliable for pores of much larger diameter. For the purposes of the present invention, nitrogen adsorption is therefore used to determine pore volumes and pore size distributions only for pores having a diameter up to and including 50 nm (i.e. only for micropores and mesopores). $PD_{50}$ are likewise determined relative to the total volume of micropores and mesopores only.

In view of the limitations of available analytical techniques it is not possible to measure pore volumes and pore size distributions across the entire range of micropores, mesopores and macropores using a single technique. In the case that the porous particles comprise macropores, the volume of pores having diameter in the range from greater than 50 nm and up to 100 nm may be measured by mercury porosimetry and is preferably no more than 0.3 $cm^3$/g, or no more than 0.20 $cm^3$/g, or no more than 0.1 $cm^3$/g, or no more than 0.05 $cm^3$/g. A small fraction of macropores may be useful to facilitate electrolyte access into the pore network, but the advantages of the invention are obtained substantially by accommodating silicon in micropores and smaller mesopores.

Any pore volume measured by mercury porosimetry at pore sizes of 50 nm or below is disregarded (as set out above, nitrogen adsorption is used to characterize the mesopores and micropores). Pore volume measured by mercury porosimetry above 100 nm is assumed for the purposes of the invention to be inter-particle porosity and is also disregarded.

Mercury porosimetry is a technique that characterizes the porosity and pore diameter distributions of a material by applying varying levels of pressure to a sample of the material immersed in mercury. The pressure required to intrude mercury into the pores of the sample is inversely proportional to the size of the pores. Values obtained by mercury porosimetry as reported herein are obtained in accordance with ASTM UOP578-11, with the surface tension y taken to be 480 mN/m and the contact angle φ taken to be 140° for mercury at room temperature. The density of mercury is taken to be 13.5462 g/$cm^3$ at room temperature. A number of high precision mercury porosimetry instruments are commercially available, such as the AutoPore IV series of automated mercury porosimeters available from Micromeritics Instrument Corporation, USA. For a complete review of mercury porosimetry reference may be made to P. A. Webb and C. Orr in "Analytical Methods in Fine Particle Technology, 1997, Micromeritics Instrument Corporation, ISBN 0-9656783-0.

It will be appreciated that intrusion techniques such as gas adsorption and mercury porosimetry are effective only to determine the pore volume of pores that are accessible to nitrogen or to mercury from the exterior of the porous particles. Porosity values specified herein shall be understood as referring to the volume of open pores, i.e. pores that are accessible to a fluid from the exterior of the porous particles. Fully enclosed pores which cannot be identified by nitrogen adsorption or mercury porosimetry shall not be taken into account herein when determining porosity values. Likewise, any pore volume located in pores that are so small as to be below the limit of detection by nitrogen adsorption is not taken into account.

The porous particles are preferably porous conductive particles. A preferred type of porous conductive particles is porous carbon particles. The porous carbon particles preferably comprise at least 80 wt % carbon, more preferably at least 90 wt % carbon, more preferably at least 95 wt % carbon, and optionally at least 98 wt % or at least 99 wt % carbon. The carbon may be crystalline carbon or amorphous carbon, or a mixture of amorphous and crystalline carbon. The porous carbon particles may be either hard carbon particles or soft carbon particles.

As used herein, the term "hard carbon" refers to a disordered carbon matrix in which carbon atoms are found predominantly in the $sp^2$ hybridised state (trigonal bonds) in nanoscale polyaromatic domains. The polyaromatic domains are cross-linked with a chemical bond, e.g. a C—O—C bond. Due to the chemical cross-linking between the polyaromatic domains, hard carbons cannot be converted to graphite at high temperatures. Hard carbons have graphite-like character as evidenced by the large G-band (~1600 $cm^{-1}$) in the Raman spectrum. However, the carbon is not fully graphitic as evidenced by the significant D-band (~1350 $cm^{-1}$) in the Raman spectrum. The graphitic nature of carbon materials can be assessed by monitoring the ratio in peak intensity of the D-band to the G-band (ID/IG). The porous carbon particles may comprise an ID/IG of no more than 0.84, or no more than 0.75.

As used herein, the term "soft carbon" also refers to a disordered carbon matrix in which carbon atoms are found predominantly in the $sp^2$ hybridised state (trigonal bonds) in polyaromatic domains having dimensions in the range from 5 to 200 nm. In contrast to hard carbons, the polyaromatic domains in soft carbons are associated by intermolecular forces but are not cross-linked with a chemical bond. This means that they will graphitise at high temperature. The porous carbon particles preferably comprise at least 50% $sp^2$ hybridised carbon as measured by XPS. For example, the porous carbon particles may suitably comprise from 50% to 98% $sp^2$ hybridised carbon, from 55% to 95% $sp^2$ hybridised carbon, from 60% to 90% $sp^2$ hybridised carbon, or from 70% to 85% $sp^2$ hybridised carbon.

A variety of different materials may be used to prepare suitable porous carbon frameworks. Examples of organic materials that may be used include plant biomass including lignocellulosic materials (such as coconut shells, rice husks, wood etc.) and fossil carbon sources such as coal. Examples of resins and polymeric materials which form porous carbon particles on pyrolysis include phenolic resins, novolac resins, pitch, melamines, polyacrylates, polystyrenes, polyvinylalcohol (PVA), polyvinylpyrrolidone (PVP), and various copolymers comprising monomer units of acrylates, styrenes, α-olefins, vinyl pyrrolidone and other ethylenically unsaturated monomers. A variety of different carbon materials are available in the art depending on the starting material and the conditions of the pyrolysis process. Porous carbon particles of various different specifications are available from commercial suppliers.

The porous carbon particles may undergo a chemical or gaseous activation process to increase the volume of mesopores and micropores. A suitable activation process comprises contacting pyrolyzed carbon with one or more of oxygen, steam, CO, $CO_2$ and KOH at a temperature in the range from 600 to 1000° C.

Mesopores can also be obtained by known templating processes, using extractable pore formers such as MgO and other colloidal or polymer templates which can be removed by thermal or chemical means post pyrolysis or activation.

Alternatives to carbon-based conductive particles include porous metal oxides, such as oxides of titanium having the formula $TiO_x$ where x has a value greater than 1 and less than 2.

The porous particles preferably have a BET surface area of at least 750 m²/g, or at least 1,000 m²/g, or at least 1,250 m²/g, or at least 1,500 m²/g. The term "BET surface area" as used herein should be taken to refer to the surface area per unit mass calculated from a measurement of the physical adsorption of gas molecules on a solid surface, using the Brunauer-Emmett-Teller theory, in accordance with ISO 9277. Preferably, the BET surface area of the porous particles is no more than 4,000 m²/g, or no more than 3,500 m²/g, or no more than 3,250 m²/g, or no more than 3,000 m²/g or no more than 2,500 m²/g, or no more than 2,000 m²/g. For example, the porous particles may have a BET surface area in the range from 750 m²/g to 4,000 m²/g, or from 1,000 m²/g to 3,500 m²/g, or from 1,250 m²/g to 3,250 m²/g, or from 1,500 m²/g to 3,000 m²/g.

The porous particles preferably have a particle density of at least 0.35 and preferably less than 3 g/cm³, more preferably less than 2 g/cm³, more preferably less than 1.5 g/cm³, most preferably from 0.35 to 1.2 g/cm³. As used herein, the term "particle density" refers to "apparent particle density" as measured by mercury porosimetry (i.e. the mass of a particle divided by the particle volume wherein the particle volume is taken to be the sum of the volume of solid material and any closed or blind pores (a "blind pore" is pore that is too small to be measured by mercury porosimetry)). In general, the particulate additives used in the present invention have a low BET surface area and thus a relatively low volume of open pores. Accordingly, the apparent density as measured by mercury porosimetry is a close approximation to the "effective particle density" (the calculation of which includes the volume of open pores). Preferably, the porous particles have particle density of at least 0.4 g/cm³, or at least 0.45 g/cm³, or at least 0.5 g/cm³, or at least 0.55 g/cm³, or at least 0.6 g/cm³, or at least 0.65 g/cm³, or at least 0.7 g/cm³. Preferably, the porous particles have particle density of no more than 1.15 g/cm³, or no more than 1.1 g/cm³, or no more than 1.05 g/cm³, or no more than 1 g/cm³, or no more than 0.95 g/cm³, or no more than 0.9 g/cm³.

Preferred porous particles for use according to the invention include those in which:
(i) the $D_{50}$ particle diameter is in the range from 0.5 to 30 μm;
(ii) the total pore volume of micropores and mesopores as measured by gas adsorption is in the range from 0.5 to 1.5 cm³/g;
(iii) the $PD_{50}$ pore diameter as measured by gas adsorption is no more than 5 nm;

Silicon Precursor Gas

The silicon precursor gas comprises a silicon precursor. A silicon precursor is a silicon compound or mixture of silicon compounds that is gaseous at the temperature of the CVI process and thermally decomposable to form elemental silicon and by-product gases. The silicon precursor gas optionally includes other gases, such as an inert gas. Examples of suitable silicon precursors include silane ($SiH_4$), disilane ($Si_2H_6$), trisilane ($Si_3H_8$), methylsilane, dimethylsilane and chlorosilanes, and mixtures thereof. Preferably, the silicon precursor is selected from silane ($SiH_4$), disilane ($Si_2H_6$), trisilane ($Si_3H_8$), methylsilane and dimethylsilane. Silane ($SiH_4$) is the most preferred silicon precursor.

Preferably, the silicon precursor gas is free of chlorine, for example containing less than 1 wt %, preferably less than 0.1 wt %, preferably less than 0.01 wt % of chlorine-containing compounds.

The silicon precursor may be used undiluted (neat) or in a dilution such that the silicon precursor gas comprises at least 5 vol % of the silicon precursor and the balance of a gas selected from hydrogen and an inert gas, optionally wherein the inert gas is selected from nitrogen and argon. The silicon precursor gas may comprise at least 10 vol %, or at least 20 vol %, or at least 30 vol %, or at least 40 vol %, or at least 50 vol %, or at least 60 vol %, or at least 70 vol %, or at least 80 vol %, or at least 90 vol %, or at least 95 vol %, or at least 98 vol %, or at least 99 vol %, or at least 99.9 vol %, or at least 99.99 vol % of the silicon precursor. Preferably, the silicon precursor gas comprises at least 50 vol %, or at least 60 vol %, or at least 70 vol %, or at least 80 vol %, or at least 90 vol %, or at least 95 vol %, or at least 98 vol %, or at least 99 vol %, or at least 99.9 vol %, or at least 99.99 vol % of the silicon precursor. The vol % of silicon precursor refers to the concentration of silicon precursor as a proportion of the total gas (the silicon precursor gas) being introduced to the pressure reactor.

Preferably, the silicon precursor gas comprises at least 50 vol % of the silicon precursor and the pressure in the pressure reactor during step (b) may be in the range from 600 to 15000 kPa.

Preferably, the silicon precursor gas comprises at least 60 vol % of the silicon precursor and the pressure in the pressure reactor during step (b) may be in the range from 600 to 5000 kPa.

Preferably, the silicon precursor gas comprises at least 70 vol % of the silicon precursor and the pressure in the pressure reactor during step (b) may be in the range from 600 to 2000 kPa.

Preferably, the silicon precursor gas comprises at least 80 vol % of the silicon precursor and the pressure in the pressure reactor during step (b) may be in the range from 700 to 2000 kPa.

Preferably, the silicon precursor gas comprises at least 90 vol % of the silicon precursor and the pressure in the pressure reactor during step (b) may be in the range from 1000 to 2000 kPa.

Preferably, the silicon precursor gas comprises at least 95 vol % of the silicon precursor and the pressure in the pressure reactor during step (b) may be in the range from 1000 to 1600 kPa.

Preferably, the silicon precursor gas comprises at least 99.9 vol % of the silicon precursor and the pressure in the pressure reactor during step (b) may be in the range from 1000 to 1600 kPa.

Carbon Coating

The process of the invention optionally further comprises the step of contacting the composite particles with a carbon precursor gas at conditions that are effective to cause deposition of carbon within the pores and/or on the surface of the composite particles.

The carbon deposited is a pyrolytic carbon material that is formed by the thermal decomposition of a carbon containing gas (such as ethylene). It provides a number of performance advantages. It reduces the BET surface area of the composite particles by smoothing any surface defects and filling any remaining surface microporosity, thereby further reducing first cycle loss. It also improves the conductivity of the surface of the composite particles, reducing the need for conductive additives in the electrode composition. In addition, it creates an optimum surface for the formation of a stable SEI layer, resulting in improved capacity retention on cycling.

Conditions that are effective to cause deposition of carbon may comprise a temperature in the range from 350 to 700° C., or from 400 to 700° C. Preferably, the temperature is no more than 680° C., or no more than 660° C., or no more than 640° C., or no more than 620° C., or no more than 600° C., or no more than 580° C., or no more than 560° C., or no more than 540° C., or no more than 520° C., or no more than 500° C.

The minimum temperature will depend on the type of carbon precursor that is used. Preferably, the temperature is at least 300° C., or at least 350° C., or at least 400° C.

Conditions that are effective to cause deposition of carbon may comprise a pressure in the range from 1 to 600 kPa, or from 10 to 500 kPa, or from 20 to 200 kPa, or from 50 to 150 kPa, or from 80 to 120 kPa, or about 100 kPa.

Suitable carbon precursor gases include:
(i) $C_2$-$C_{10}$ hydrocarbons, optionally wherein the hydrocarbons are selected from alkanes, alkenes, alkynes, cycloalkanes, cycloalkenes, and arenes, for example methane, ethylene, propylene, limonene, styrene, cyclohexane, cyclohexene, α-terpinene and acetylene;
(ii) bicyclic monoterpenoids, optionally wherein the bicyclic monoterpenoids are selected from camphor, borneol, eucalyptol, camphene, carene, sabinene, thujene and pinene; and
(iii) polycyclic hydrocarbons comprising from 10 to 25 carbon atoms and optionally from 1 to 3 heteroatoms, optionally wherein the polyaromatic hydrocarbon is selected from naphthalene, substituted naphthalenes such as di-hydroxynaphthalene, anthracene, tetracene, pentacene, fluorene, acenapthene, phenanthrene, fluoranthrene, pyrene, chrysene, perylene, coronene, fluorenone, anthraquinone, anthrone and alkyl-substituted derivatives thereof.

The carbon precursors used may be used in pure form, or diluted mixture with an inert carrier gas, such as nitrogen or argon. For instance, the carbon precursor may be used in an amount in the range from 0.1 to 100 vol %, or 20 to 95 vol %, or 50 to 90 vol %, or 60 to 85 vol % based on the total volume of the precursor and the inert carrier gas.

Passivation

The silicon deposited in the CVI deposition has hydride-terminated silicon surfaces that are highly reactive to oxygen. The process of the invention therefore preferably comprises a passivation step whereby the composite particles can undergo controlled passivation to form a passivated material that is stable in air.

Therefore, the process of the invention may further comprise the step of: contacting the composite particles with a passivating agent at conditions that are effective to passivate the composite particles. As defined herein, a passivating agent is a compound or mixture of compounds which is able to react with the surface of the deposited silicon to form a modified surface. The composite particles may be contacted with a passivating agent in the pressure reactor, or may be conveyed to a separate vessel for contacting with a passivating agent. The composite particles may be contacted with a first passivating agent in the pressure reactor, subsequently conveyed to a separate vessel and contacted with a second passivating agent, wherein the first and second passivating agents may be the same or may be different. Preferably the composite particles are at least contacted with a passivating agent in the pressure reactor.

The process of the invention may also comprise the steps of: discontinuing deposition of the silicon to form intermediate composite particles; contacting the intermediate composite particles with a passivating agent at conditions that are effective to passivate the intermediate composite particles to provide passivated intermediate composite particles; and contacting the passivated intermediate composite particles with the silicon precursor gas at conditions effective to cause deposition of silicon in the pores of the passivated intermediate composite particles to provide composite particles.

Composite particles that have been contacted with a carbon precursor gas at conditions that are effective to cause deposition of carbon within the pores and/or on the surface of the composite particles may subsequently be contacted with a passivating agent at conditions that are effective to passivate the composite particles.

The passivating agent may be selected from (i) an oxygen containing gas; (ii) ammonia; (iii) a gas comprising ammonia and oxygen; and (iv) phosphine.

The passivating agent may be an oxygen containing gas. In this case, conditions that are effective to passivate the composite particles may comprise a temperature in the range from 20 to 300° C., or from 20 to 200° C., or from 25 to 200° C., or from 25 to 180° C., or from 50° C. to 160° C. Preferably, the temperature is no more than 150° C. Further, conditions that are effective to passivate the composite particles may comprise a pressure in the range from 1 to 600 kPa, or from 10 to 500 kPa, or from 20 to 200 kPa, or from 50 to 150 kPa, or from 80 to 120 kPa, or about 100 kPa. The oxygen containing gas may be air. When the oxygen containing gas is air, the concentration of oxygen in contact with the composite particles during the passivation step may be increased over a period of time, optionally as the composite particles are cooled down to a temperature less than 50° C.

The passivating agent may be ammonia or another nitrogen containing molecule. In this case, the passivation layer may comprise a silicon nitride of the formula $SiN_x$, wherein $0<x\leq4/3$. The silicon nitride is preferably amorphous silicon nitride. A nitride layer may be formed by contacting the composite particles with ammonia at a temperature in the range from 200-700° C., preferably from 400-700° C., more preferably from 400-600° C. The temperature may then be increased if necessary into the range of 500 to 1,000° C. to form a nitride surface (e.g. a silicon nitride surface of the formula SiNx, wherein x≤4/3). As sub-stoichiometric nitrides (such as $SiN_x$, wherein $0<x\leq4/3$) are conductive, nitride interlayers function as a conductive network that allows for faster charging and discharging of the electroactive material.

Phosphine may also be used as a passivating agent, as a phosphorus analog of ammonia.

The passivating agent may comprise ammonia (or another nitrogen containing molecule) and oxygen gas. In this case, the passivation layer may comprise a silicon oxynitride of the formula $SiO_xN_y$, wherein $0<x<2$, $0<y<4/3$, and $0<(2x+3y)\leq4)$. The silicon nitride is preferably amorphous silicon oxynitride. An oxynitride layer may be formed by contacting the composite particles with a passivating agent comprising ammonia (or another nitrogen containing molecule) and oxygen gas.

Other suitable passivating agents include compounds comprising an alkene, alkyne or carbonyl functional group, more preferably a terminal alkene, terminal alkyne, aldehyde or ketone group.

Preferred passivating agents include one or more compounds of the formulae:

$$R^1\!-\!CH\!=\!CH\!-\!R^1; \qquad (i)$$

$$R^1\!-\!C\!\equiv\!C\!-\!R^1; \text{ and} \qquad (ii)$$

$$O\!=\!CR^1R^1; \qquad (iii)$$

wherein each $R^1$ independently represents H or an unsubstituted or substituted aliphatic or aromatic hydrocarbyl group having from 1 to 20 carbon atoms, or wherein two $R^1$ groups form an unsubstituted or substituted ring structure comprising from 3 to 8 carbon atoms in the ring.

Particularly preferred passivating agents include one or more compounds of the formulae:

$$CH_2\!=\!CH\!-\!R^1; \text{ and} \qquad (i)$$

$$HC\!\equiv\!C\!-\!R^1; \qquad (ii)$$

wherein $R^1$ is as defined above. Preferably, $R^1$ is unsubstituted.

Examples of suitable passivating agents include ethylene, propylene, 1-butene, butadiene, 1-pentene, 1,4-pentadiene, 1-hexene, 1-octene, styrene, divinylbenzene, acetylene, phenylacetylene, norbornene, norbornadiene and bicyclo[2.2.2]oct-2-ene. Optionally, mixtures of different passivating agents may also be used.

It is believed that passivating agents comprising an alkene, alkyne or carbonyl group undergo an insertion reaction with M-H groups at the surface of the electroactive material (where M represents an atom of the electroactive material) to form a covalently passivated surface which is resistant to oxidation by air. When silicon is the electroactive material, the passivation reaction between the silicon surface and the passivating agent may be understood as a form of hydrosilylation, as shown schematically below.

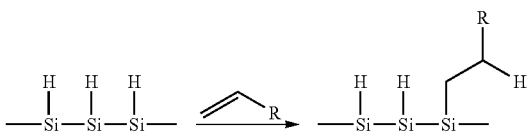

Other suitable passivating agents include compounds including an active hydrogen atom bonded to oxygen, nitrogen, sulphur or phosphorus. For example, the passivating agent may be an alcohol, amine, thiol or phosphine. Reaction of the group —XH with hydride groups at the surface of the electroactive material is understood to result in elimination of $H_2$ and the formation of a direct bond between X and the electroactive material surface.

Suitable passivating agents in this category include compounds of the formula $$HX\!-\!R^2, \text{ and} \qquad (iv)$$

$$HX\!-\!C(O)\!-\!R^1, \qquad (v)$$

wherein X represents O, S, $NR^1$ or $PR^1$; each $R^1$ is independently as defined above; and $R^2$ represents an unsubstituted or substituted aliphatic or aromatic hydrocarbyl group having from 1 to 20 carbon atoms, or $R^1$ and $R^2$ together form an unsubstituted or substituted ring structure comprising from 3 to 8 carbon atoms in the ring.

Preferably X represents O or NH.

Preferably $R^2$ represents an optionally substituted aliphatic or aromatic group having from 2 to 10 carbon atoms. Amine groups may also be incorporated into a 4-10 membered aliphatic or aromatic ring structure, as in pyrrolidine, pyrrole, imidazole, piperazine, indole, or purine.

Contacting of the composite particles with the passivating agent may be carried out at a temperature in the range of 25 to 700° C., preferably at a temperature in the range of from 50 to 500° C., more preferably from 100 to 300° C.

Gas Separation Unit

The process could encounter low silicon precursor conversion during CVI deposition because effluent gas (including silicon precursor) is withdrawn during the reaction. Although this process beneficially maintains the concentration of silicon precursor during the reaction, low conversion would have a negative impact on operational cost. Therefore, the effluent gas may comprise silicon precursor and at least one by-product gas, and the process may further comprise the steps of:

feeding at least a portion of the effluent gas to a gas separation unit; and operating the gas separation unit to separate the silicon precursor from the at least one by-product gas.

Separating the silicon precursor and the at least one by-product gas provides at least one enriched gas stream and at least one waste gas stream, wherein the enriched gas stream is enriched in the silicon precursor compared to the effluent gas and wherein the waste gas stream is depleted in the silicon precursor compared to the effluent gas.

The enriched gas stream may comprise the at least one by-product gas from the effluent gas, but it is preferred that the amount of the at least one by-product gas is minimised. For example, the enriched gas stream may comprise at least 60 vol % silicon precursor, or at least 70 vol % silicon precursor, or at least 80 vol % silicon precursor, or at least 90 vol % silicon precursor, or at least 95 vol % silicon precursor, or at least 98 vol % silicon precursor. The waste gas stream may comprise silicon precursor, but it is preferred that the amount of silicon precursor is minimised. For example, the waste gas stream may comprise less than 40 vol % silicon precursor, or less than 30 vol % silicon precursor, or less than 20 vol % silicon precursor, or less than 10 vol % silicon precursor, or less than 5 vol % silicon precursor.

For example, CVI deposition of silane produces hydrogen gas as a by-product and unreacted silane can be separated from the silane/hydrogen mixture in the effluent gas using a gas separation unit to provide an enriched gas stream that is enriched in silane compared to the effluent gas and a waste gas stream comprising hydrogen and which is depleted in silane compared to the effluent gas.

The enriched gas stream comprising silicon precursor may be recycled into the pressure reactor, for example as part of step (b) thus minimising its make-up. Therefore, the process may comprise the step of:

introducing (recycling) at least a portion of the enriched gas stream into the pressure reactor.

The enriched gas stream may be mixed with the silicon precursor gas introduced in step (b) and the mixture introduced into the pressure reactor via the same gas inlet(s). Alternatively or in addition, the enriched gas stream may be introduced into the pressure reactor via a different gas inlet(s) to the silicon precursor gas introduced in step (b). Alternatively or in addition, the enriched gas stream comprising silicon precursor may be stored. Similarly, the waste gas stream comprising by-product gases such as hydrogen may be stored.

Step (b) may comprise combining at least a portion of the enriched gas stream with the silicon precursor gas before being introduced into the pressure reactor. Alternatively or in addition, the process may further comprise the step of: introducing at least a portion of the enriched gas stream into the pressure reactor separately from the silicon precursor gas. Alternatively or in addition, the process may further comprise the step of: collecting at least a portion of the enriched gas stream and/or waste gas stream for storage. Alternatively or in addition, at least a portion of the enriched gas stream may undergo further processes to purify the silicon precursor gas.

At least a portion of the waste gas stream may undergo further processes to recover energy and/or purify the by-product gases. At least a portion of the waste gas stream may be purified. Alternatively or in addition, at least a portion of the waste gas stream may be processed to recover energy therefrom. Alternatively or in addition, at least a portion of the waste gas stream may be fed to a supply grid. Alternatively or in addition, at least a portion of the waste gas stream may be used as a feedstock in a further process.

A portion of the effluent gas may bypass the gas separation unit as a bypass stream. Therefore, the process may further comprise the step of: bypassing a portion of the effluent gas around the gas separation unit as a bypass stream. Step (b) may comprise combining at least a portion of the bypass stream with the silicon precursor gas before being introduced into the pressure reactor. Alternatively or in addition, at least a portion of the bypass stream may be introduced into the pressure reactor separately from the silicon precursor gas. The process may comprise separating a bypass stream from the effluent stream and recycling the bypass stream into the pressure reactor without separating the silicon precursor in the bypass stream from the by-product gas in the bypass stream The effluent gas may comprise from 5 to 80 vol % of the silicon precursor, or from 5 to 70 vol %, or from 5 to 60 vol %, or from 5 to 50 vol % of the silicon precursor.

The by-product gas may comprise hydrogen and the gas separation unit may be a hydrogen ($H_2$)-selective membrane. The by-product gas may comprise hydrogen and the gas separation unit may be a hydrogen ($H_2$)-silane selective membrane.

The effluent gas may comprise an inert gas, and the process may comprise the step of: using the gas separation unit to separate the inert gas and the silicon precursor and/or the at least one by-product gas. The inert gas, the silicon precursor and the at least one by-product gas may be separated sequentially. For example, silicon precursor may be separated from the inert gas and the at least one by-product gas, then the at least one by-product gas may be separated from the inert gas. In this case, the gas separation unit may comprise two or more systems for separating the gases.

The gas separation unit may comprise a membrane separation system such as a polymeric membrane separation system and/or a metal alloy membrane separation system, a pressure swing adsorption system, a cryogenic separation system, a gas distillation system, or a combination thereof. The gas separation unit may comprise a membrane separation system and a pressure swing adsorption system.

The separation unit may comprise a heat exchanger to cool the effluent gas to ambient or near ambient temperature, such as less than 70° C., or less than 50° C., before the effluent gas is separated into an enriched gas stream and a waste gas stream. Therefore, the process may comprise the step of: cooling the effluent gas to ambient or near ambient temperature, such as less than 70° C., or less than 50° C.

When the process uses a gas separation unit, it is preferred that during said contacting, the ratio of flow rate of silicon in the silicon precursor gas in grams per minute to mass of porous particles in the pressure reactor in grams is in the range from 0.009 to 0.03.

When the process uses a gas separation unit, it is preferred that during said contacting, the ratio of flow rate of silicon in the silicon precursor gas in grams per minute to (mass of porous particles in the pressure reactor in grams×internal free volume of the reactor in litres) is in the range from 0.0003 to 0.001.

Operating the process in these conditions sustains high silicon precursor concentrations in the pressure reactor while minimising silicon precursor losses.

FIGURES

The present invention is further described with reference to the appended figures, in which.

Figure 1:
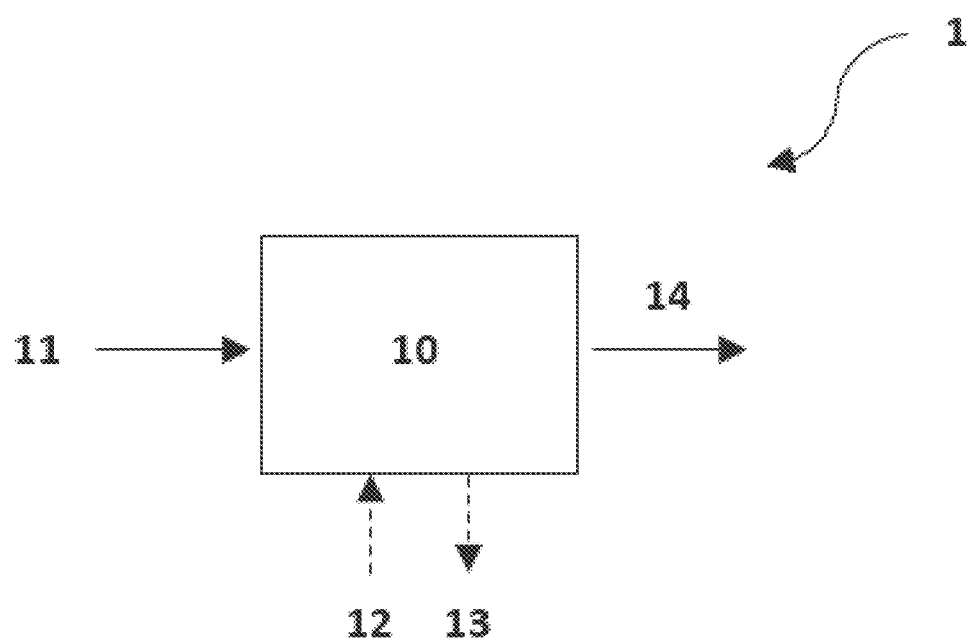
FIG. 1 is a schematic representation the apparatus of a pressure reactor operated according to an embodiment of the invention.

With reference to FIG. 1, there is shown a CVI apparatus (1) comprising a pressure reactor (10), a supply of silicon precursor gas (11) into the pressure reactor, a supply of porous particles (12) into the pressure reactor, composite particles (13) withdrawn of from the pressure reactor, and effluent gas (14) withdrawn from the pressure reactor.

Figure 2:
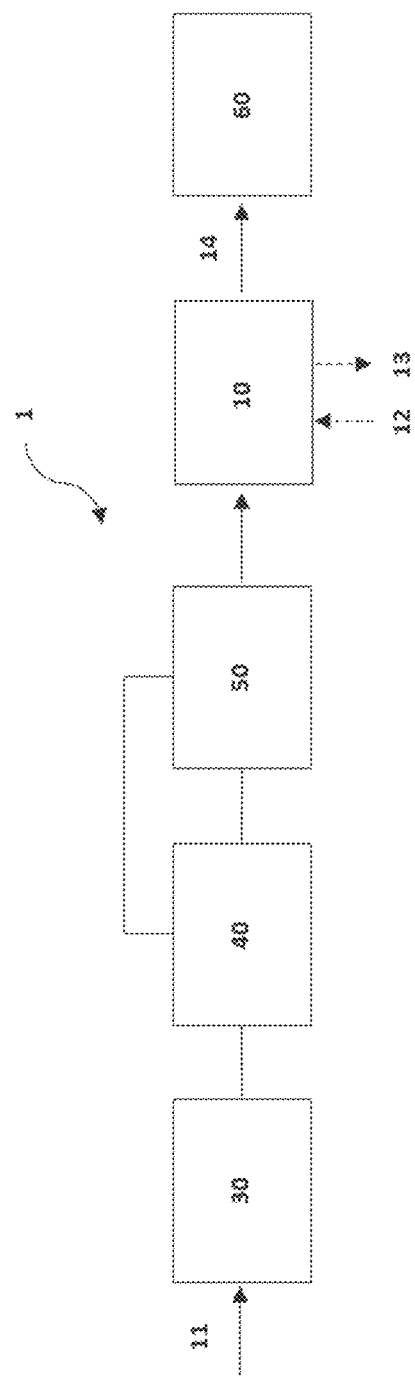
FIG. 2 is a schematic representation the apparatus of a pressure reactor operated according to an embodiment of the invention.

With reference to FIG. 2, there is shown a CVI apparatus (1) comprising a pressure reactor (10), a supply of silicon precursor gas (11) into the pressure reactor, a supply of porous particles (12) into the pressure reactor, composite particles (13) withdrawn of from the pressure reactor, and effluent gas (14) withdrawn from the pressure reactor. The supply of silicon precursor gas flows through means for determining the flow rate of silicon precursor gas (30), then through a feedback-controlled valve (40), then through means for determining the pressure of the silicon precursor gas (50), then into the pressure reactor. The means for determining the pressure of the silicon precursor gas provides feedback to the feedback-controlled valve that can change between an open state and a closed state in order to control the pressure within the pressure reactor. A gas release valve (60) controls the flow rate of effluent gas withdrawn from the pressure reactor.

Figure 3:
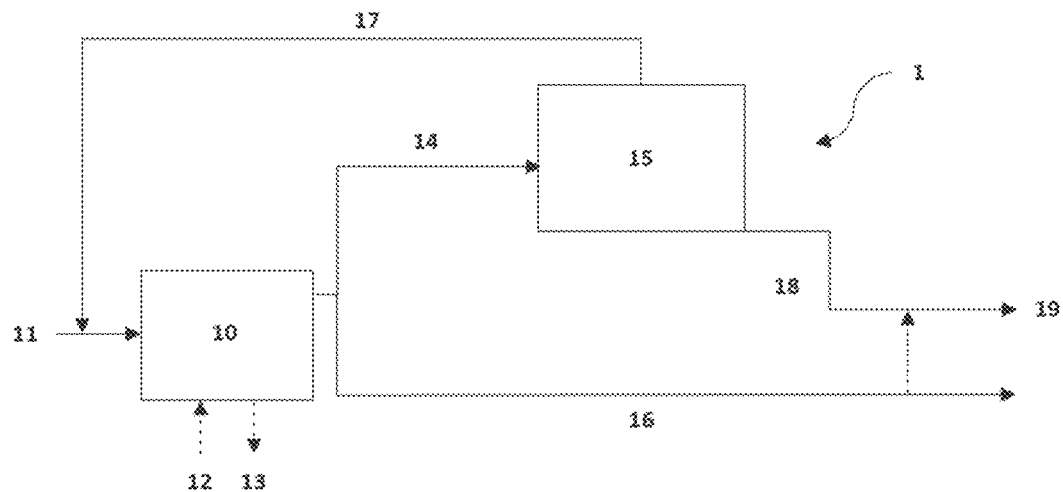
FIG. 3 is a schematic representation of the apparatus for performing CVI operated according to an embodiment of the invention.

With reference to FIG. 3, there is shown a CVI apparatus (1) comprising a pressure reactor (10), a supply of silicon precursor gas (11) into the pressure reactor, a supply of porous particles (12) into the pressure reactor, composite particles (13) withdrawn of from the pressure reactor, effluent gas (14) withdrawn from the pressure reactor to a gas separation unit (15), a bypass stream (16) withdrawn from the pressure reactor that bypasses the gas separation unit, an enriched gas stream (17) withdrawn from the gas separation unit, then combined with the silicon precursor gas and introduced into the pressure reactor, and a waste gas stream (18) withdrawn from the gas separation unit. The bypass stream may be combined with the waste gas stream as indicated by the dashed line between the bypass stream and the waste gas stream. The waste gas stream may undergo further processing (19). For example, the waste gas stream may be introduced into a storage unit for storing gases from the waste gas stream and optionally gases from the bypass stream. Alternatively or in addition, the waste gas stream may be purified. Alternatively or in addition, the waste gas stream may be processed to recover energy therefrom. Alternatively or in addition, the waste gas stream may be fed to a supply grid.

Figure 4:
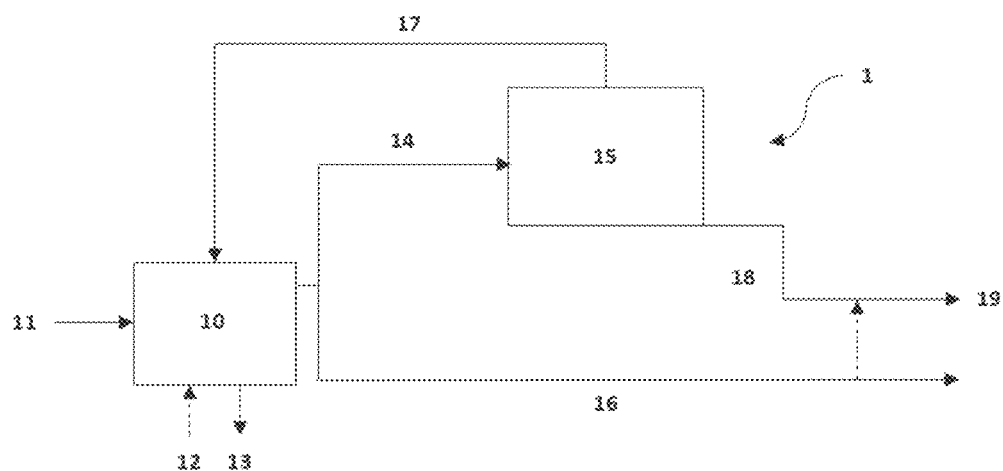
FIG. 4 is a schematic representation of the apparatus for performing CVI operated according to an embodiment of the invention.

With reference to FIG. 4, there is shown a CVI apparatus (1) comprising a pressure reactor (10), a supply of silicon precursor gas (11) into the pressure reactor, a supply of porous particles (12) into the pressure reactor, composite particles (13) withdrawn of from the pressure reactor, effluent gas (14) withdrawn from the pressure reactor to a gas separation unit (15), a bypass stream (16) withdrawn from the pressure reactor that bypasses the gas separation unit, an enriched gas stream (17) withdrawn from the gas separation unit, which is introduced into the pressure reactor separately from the silicon precursor gas, and a waste gas stream (18) withdrawn from the gas separation unit. The bypass stream may be combined with the waste gas stream as indicated by the dashed line between the bypass stream and the waste gas stream. The waste gas stream may undergo further processing (19). For example, the waste gas stream may be introduced into a storage unit for storing gases from the waste gas stream and optionally gases from the bypass stream. Alternatively or in addition, the waste gas stream may be purified. Alternatively or in addition, the waste gas stream may be processed to recover energy therefrom. Alternatively or in addition, the waste gas stream may be fed to a supply grid.

Figure 5:
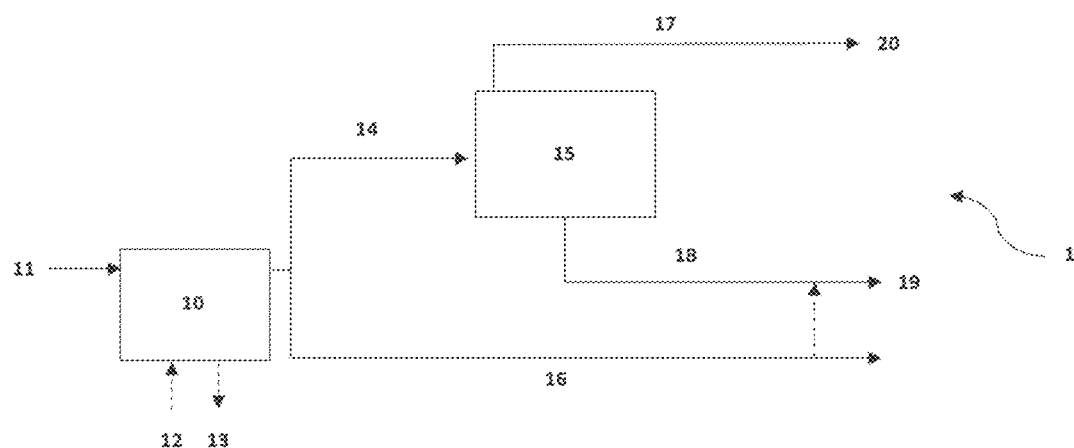
FIG. 5 is a schematic representation of the apparatus for performing CVI operated according to an embodiment of the invention.

With reference to FIG. 5, there is shown a CVI apparatus (1) comprising a pressure reactor (10), a supply of silicon precursor gas (11) into the pressure reactor, a supply of porous particles (12) into the pressure reactor, composite particles (13) withdrawn from the pressure reactor, effluent gas (14) withdrawn from the pressure reactor to a gas separation unit (15), a bypass stream (16) withdrawn from the pressure reactor that bypasses the gas separation unit, an enriched gas stream (17) withdrawn from the gas separation unit and introduced into a storage unit (20), the storage unit for storing gases from the enriched gas stream, and a waste gas stream (18) withdrawn from the gas separation unit. The bypass stream may be combined with the waste gas stream as indicated by the dashed line between the bypass stream and the waste gas stream. The waste gas stream may undergo further processing (19). For example, the waste gas stream may be introduced into a storage unit for storing gases from the waste gas stream and optionally gases from the bypass stream. Alternatively or in addition, the waste gas stream may be purified. Alternatively or in addition, the waste gas stream may be processed to recover energy therefrom. Alternatively or in addition, the waste gas stream may be fed to a supply grid.

Figure 6:
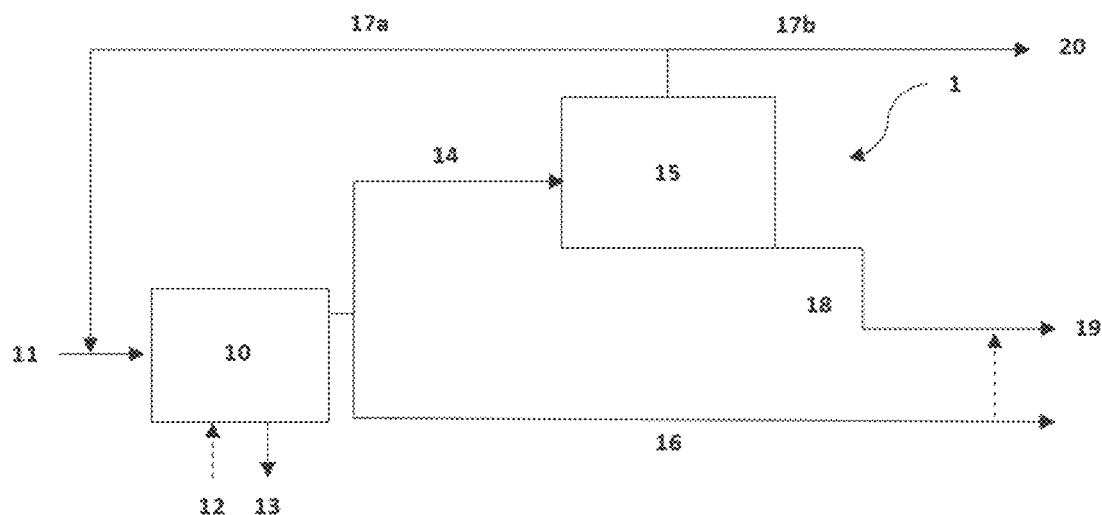
FIG. 6 is a schematic representation of the apparatus for performing CVI operated according to an embodiment of the invention.

With reference to FIG. 6, there is shown a CVI apparatus (1) comprising a pressure reactor (10), a supply of silicon precursor gas (11) into the pressure reactor, a supply of porous particles (12) into the pressure reactor, composite particles (13) withdrawn from the pressure reactor, effluent gas (14) withdrawn from the pressure reactor to a gas separation unit (15), a bypass stream (16) withdrawn from the pressure reactor that bypasses the gas separation unit, an enriched gas stream (17a) withdrawn from the gas separation unit, which is optionally combined with the silicon precursor gas, and introduced into the pressure reactor, an enriched gas stream (17b) withdrawn from the gas separation unit and introduced into a storage unit (20), the storage unit for storing gases from the enriched gas stream, and a waste gas stream (18) withdrawn from the gas separation unit. The bypass stream may be combined with the waste gas stream as indicated by the dashed line between the bypass stream and the waste gas stream. The waste gas stream may undergo further processing (19). For example, the waste gas stream may be introduced into a storage unit for storing gases from the waste gas stream and optionally gases from the bypass stream. Alternatively or in addition, the waste gas stream may be purified. Alternatively or in addition, the waste gas stream may be processed to recover energy therefrom. Alternatively or in addition, the waste gas stream may be fed to a supply grid.

Figure 7:
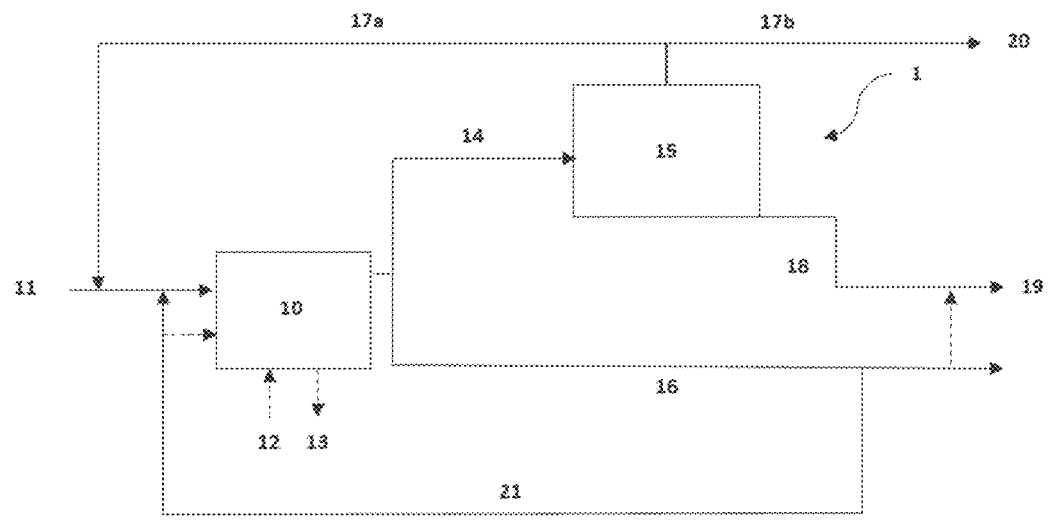
FIG. 7 is a schematic representation of the apparatus for performing CVI operated according to an embodiment of the invention.

With reference to FIG. 7, there is shown a CVI apparatus (1) comprising a pressure reactor (10), a supply of silicon precursor gas (11) into the pressure reactor, a supply of porous particles (12) into the pressure reactor, composite particles (13) withdrawn from the pressure reactor, effluent gas (14) withdrawn from the pressure reactor to a gas separation unit (15), a bypass stream (16) withdrawn from the pressure reactor that bypasses the gas separation unit, an enriched gas stream (17a) withdrawn from the gas separation unit, which is optionally combined with the silicon precursor gas, and introduced into the pressure reactor, an enriched gas stream (17b) withdrawn from the gas separation unit and introduced into a storage unit (20), the storage unit for storing gases from the enriched gas stream, and a waste gas stream (18) withdrawn from the gas separation unit. At least a portion of the bypass stream (21) is combined with the silicon precursor gas before being introduced into the pressure reactor. Alternatively or in addition, at least a portion of the bypass stream may be introduced into the reaction zone/pressure reactor separately from the silicon precursor gas as indicated by the dashed line between the portion of bypass stream and the pressure reactor. At least a portion of the bypass stream may be combined with the waste gas stream as indicated by the dashed line between the bypass stream and the waste gas stream. The waste gas stream may undergo further processing (19). For example, the waste gas stream may be introduced into a storage unit for storing gases from the waste gas stream and optionally gases from the bypass stream. Alternatively or in addition, the waste gas stream may be purified. Alternatively or in addition, the waste gas stream may be processed to recover energy therefrom. Alternatively or in addition, the waste gas stream may be fed to a supply grid.

Figure 8:
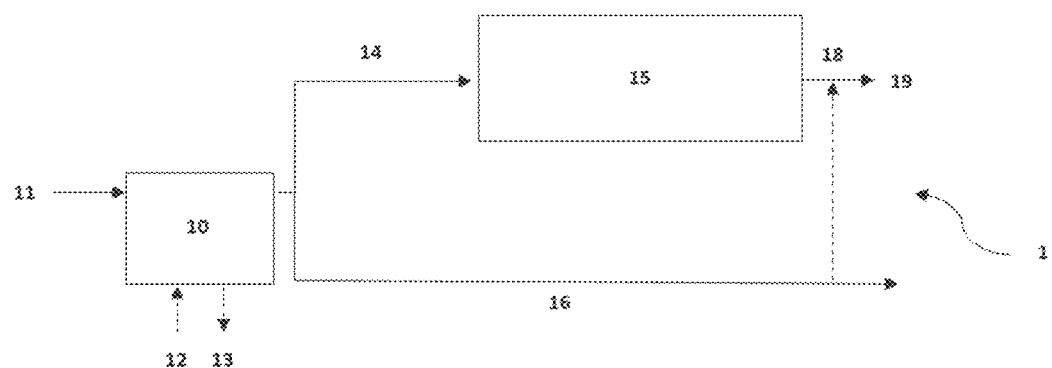
FIG. 8 is a schematic representation of the apparatus for performing CVI operated according to an embodiment of the invention.

With reference to FIG. 8, there is shown a CVI apparatus (1) comprising a pressure reactor (10), a supply of silicon precursor gas (11) into the pressure reactor, a supply of porous particles (12) into the pressure reactor, composite particles (13) withdrawn from the pressure reactor, effluent gas (14) in fluid communication with the pressure reactor and a gas separation unit (15), a bypass stream (16) withdrawn from the pressure reactor that bypasses the gas separation unit, and a waste gas stream (18) withdrawn from the gas separation unit. At least a portion of the bypass stream may be combined with the waste gas stream as indicated by the dashed line between the bypass stream and the waste gas stream. The waste gas stream may undergo further processing (19). For example, the waste gas stream may be introduced into a storage unit for storing gases from the waste gas stream and optionally gases from the bypass stream. Alternatively or in addition, the waste gas stream may be purified. Alternatively or in addition, the waste gas stream may be processed to recover energy therefrom. Alternatively or in addition, the waste gas stream may be fed to a supply grid. This configuration differs from those shown in FIGS. 3-7 in that the gas separation unit prevents silicon precursor from passing through, such that the silicon precursor remains within the pressure reactor, and the at least one by-product gas is separated from the silicon precursor as the waste gas stream. This configuration allows for a higher degree of conversion of silicon precursor because the at least one by-product gas is withdrawn from the pressure reactor while the silicon precursor remains available for reaction in the pressure reactor. In this configuration, the gas separation unit may consist of a membrane separation system.

EXAMPLE

Modelling was used to determine the total CVI deposition time for a comparative process operating as batch with respect to dosing of silicon precursor gas and batch with respect to dosing of porous particles. Modelling was also used to determine the total CVI deposition time for an inventive process, operating as semi-continuous with respect to dosing of silicon precursor gas and batch with respect to dosing of porous particles. The results are shown in the table below.

Operating the pressure reactor in accordance with the invention results in a reduction of CVI deposition time of 13.7 hours, which is a reduction of approximately 65%. Furthermore, reactor productivity is increased by approximately 286%.

|  | Comparative | Example |
| --- | --- | --- |
| Product made/g | 1041.666667 | 1041.666667 |
| Silane supplied/L | 700 | 700 |
| Average conversion/% | 90 | 90 |
| Percentage silicon in composite particles | 52.4 | 52.4 |
| Number of CVI deposition cycles required | 14 | 200 |
| Average silane converted per cycle/g | 50 | 3.5 |
| Pressure per cycle/barg |  | 0.538461538 |
| Silane flow rate/g min$^{-1}$ | 5 | 5 |
| Silane reaction rate/g min$^{-1}$ | 0.833333333 | 2.058823529 |
| Silane supplied per cycle/min | 10 | 0.7 |
| Reaction time per cycle/min | 60 | 1 |
| Average downtime per cycle/min | 20 | 0.5 |
| Reactor size/L | 6 | 6 |
| Total CVI deposition time/hours | 21 | 7.333333333 |
| Reactor productivity/g hr$^{-1}$ L$^{-1}$ | 8.267195767 | 23.67424242 |

The invention claimed is:

1. A process for preparing composite particles, the process comprising the steps of:
   (a) providing a plurality of porous particles in a pressure reactor;
   (b) contacting the plurality of porous particles with a silicon precursor gas at conditions effective to cause deposition of silicon in the pores of the porous particles to provide composite particles comprising a porous particle framework and elemental silicon within the pores of the porous particle framework;
   (c) during step (b), withdrawing an effluent gas from the pressure reactor;
   wherein the silicon precursor gas is introduced into the pressure reactor continuously;
   wherein the concentration of silicon precursor as a proportion of the silicon precursor gas introduced into the reactor is at least 30 vol %;
   wherein the conditions in step (b) include a pressure in the range from 120 to 5000 kPa; and
   wherein step (b) comprises continuously mechanically agitating the porous particles, wherein said agitating is carried out by a high shear mixer.

2. The process according to claim 1, wherein the flow rate of the silicon precursor gas into the pressure reactor in grams of silicon per minute per kilogram of porous particles is from 0.2 to 25 gmin$^{-1}$kg$^{-1}$.

3. The process according to claim 1, wherein the flow rate of the silicon precursor gas into the pressure reactor in grams of silicon per minute per litre of reactor volume (gmin$^{-1}$/L$_{RV}$) is from 0.03 to 40 gmin$^{-1}$/L$_{RV}$.

4. The process according to claim 1, wherein the mole fraction of silicon precursor in the pressure reactor during step (b) is maintained in the range from 0.2 to 0.8 based on total moles of gaseous compounds in the pressure reactor.

5. The process according to claim 1, wherein during said contacting, the ratio of flow rate of silicon in the silicon precursor gas into the pressure reactor in grams per minute to (mass of porous particles in the pressure reactor in grams × internal free volume of the reactor in litres) is in the range from 0.0002 to 0.025.

6. The process according to claim 1, wherein the conditions in step (b) include a reaction temperature in the range from 355 to 395° C.

7. The process according to claim 1, wherein the porous particles have:
   (i) a D$_{50}$ particle diameter in the range from 0.5 to 200 μm;
   (ii) a total pore volume of micropores and mesopores as measured by gas adsorption in the range from 0.4 to 2.2 cm$^3$/g; and
   (iii) a PD$_{50}$ pore diameter as measured by gas adsorption of no more than 30 nm.

8. The process according to claim 1, wherein the silicon precursor is selected from silane (SiH$_4$), disilane (Si$_2$H$_6$), trisilane (Si$_3$H$_8$), methylsilane, dimethylsilane and chlorosilanes.

9. The process according to claim 1, wherein the step (b) comprises adjusting the flow rate of the silicon precursor into the pressure reactor from an initial flow rate to an adjusted flow rate, wherein the adjusted flow rate is greater than or less than the initial flow rate.

10. The process according to claim 9, wherein step (c) comprises measuring the concentration of silicon precursor in the effluent gas; detecting a change in the concentration of the silicon precursor in the effluent gas; and adjusting the flow rate of the silicon precursor into the pressure reactor in step (b) in response to the detected change in the concentration of silicon precursor in the effluent gas.

11. The process according to claim 10, wherein step (c) comprises detecting an increase in the concentration of the silicon precursor in the effluent gas and reducing the flow rate of the silicon precursor into the pressure reactor in step (b) in response to the detected increase in the concentration of silicon precursor in the effluent gas.

12. The process according to claim 9, wherein step (c) comprises detecting a decrease in the concentration of a by-product gas in the effluent gas and reducing the flow rate of the silicon precursor into the pressure reactor in step (b) in response to the detected decrease in the concentration of the by-product gas in the effluent gas, optionally wherein the by-product gas is hydrogen.

13. The process according to claim 9, wherein the flow rate of the silicon precursor into the pressure reactor is reduced by at least 10%.

14. The process according to claim 13, wherein the flow rate of the silicon precursor into the pressure reactor is reduced after 50% of the target mass of silicon has been deposited.

15. The process according to claim 9, wherein the absolute pressure in the reactor is kept constant while reducing the flow rate of the silicon precursor into the pressure reactor.

16. A process according to claim 1, wherein the effluent gas withdrawn from the reactor in step (c) comprises the silicon precursor and at least one by-product gas, and wherein the process further comprises the steps of:
feeding at least a portion of the effluent gas to a gas separation unit; and
operating the gas separation unit to separate the silicon precursor from the at least one by-product gas to provide an enriched gas stream that is enriched in the silicon precursor compared to the effluent gas and a waste gas stream that is depleted in the silicon precursor compared to the effluent gas.

17. The process according to claim 16, wherein the process further comprises the step of: recycling at least a portion of the enriched gas stream into the pressure reactor.

18. The process according to claim 16, wherein the process further comprises separating a bypass stream from the effluent stream and recycling the bypass stream into the pressure reactor without separating the silicon precursor in the bypass stream from the by-product gas in the bypass stream.

19. The process according to claim 1, wherein the process further comprises the step of contacting the composite particles with a passivating agent under conditions that are effective to passivate the composite particles.

20. The process according to claim 1, wherein the process further comprises the steps of:
discontinuing deposition of the silicon; and
withdrawing the composite particles from the pressure reactor.

21. The process according to claim 1, wherein step (c) comprises:
(i) continuously withdrawing the effluent gas from the pressure reactor; or
(ii) semi-continuously withdrawing the effluent gas from the pressure reactor.

22. The process according to claim 1, wherein the composite particles provided in step (d) comprise an amount of silicon that occupies from 20% to 95% of the internal pore volume of the porous particle framework.

23. The process according to claim 1, wherein the concentration of the silicon precursor as a proportion of the silicon precursor gas introduced into the reactor is at least 50 vol %.

24. The process according to claim 1, wherein the composite particles provided in step (b) comprise from 30 to 70 wt % of silicon based on the total mass of the composite particles.

25. The process according to claim 1, wherein the porous particles comprise micropores and/or mesopores.

26. The process according to claim 1, wherein the porous particles have a $D_{50}$ particle diameter in the range from 0.5 to 150 μm.

27. The process according to claim 1, wherein the porous particles have a total volume of micropores and mesopores in the range from 0.45 to 2.2 cm$^3$/g.

28. The process according to claim 1, wherein the $PD_{50}$ pore diameter of the porous conductive particles is no more than 25 nm.

* * * * *